(12) United States Patent
Hamamura et al.

(10) Patent No.: US 6,567,120 B1
(45) Date of Patent: May 20, 2003

(54) INFORMATION PROCESSING APPARATUS HAVING A PHOTOGRAPHIC MODE AND A MEMO INPUT MODE

(75) Inventors: Akihiko Hamamura, Chiba (JP); Satoshi Ejima, Tokyo (JP); Tomoaki Kawamura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/949,619

(22) Filed: Oct. 14, 1997

(30) Foreign Application Priority Data

Oct. 14, 1996 (JP) .............................. 8-270799

(51) Int. Cl.[7] .......................... H04N 5/225; H04N 5/76; H04N 5/222
(52) U.S. Cl. ............................. 348/207.99; 348/333.02; 348/231.99
(58) Field of Search ................................. 348/207, 222, 348/239, 231, 232, 233, 376, 333.02, 333.12, 231.99, 231.2, 231.3, 231.5, 207.99; 358/906, 909.1; 345/173, 156, 203, 700, 710, 716; 386/46, 77; 396/281, 310, 318, 313, 312, 296, 429, 291, 292, 297

(56) References Cited

U.S. PATENT DOCUMENTS

| | | | | |
|---|---|---|---|---|
| 5,130,813 A | * | 7/1992 | Oie et al. | 386/77 |
| 5,162,830 A | * | 11/1992 | Schappler et al. | 396/313 |
| 5,289,217 A | * | 2/1994 | Rosenblatt | 396/281 |
| 5,633,678 A | * | 5/1997 | Parulski et al. | 348/232 |
| 5,648,760 A | | 7/1997 | Kumar | |
| 5,666,186 A | * | 9/1997 | Meyerhoefer et al. | 396/310 |
| 5,689,742 A | * | 11/1997 | Chamberlain, IV | 396/313 |
| 5,717,967 A | * | 2/1998 | Lee et al. | 396/313 |
| 5,805,215 A | * | 9/1998 | Mizoguchi | 348/232 |
| 5,903,309 A | * | 5/1999 | Anderson | 348/232 |
| 5,974,386 A | * | 10/1999 | Ejima et al. | 345/978 |
| 6,134,392 A | * | 10/2000 | Gove | 396/296 |

FOREIGN PATENT DOCUMENTS

GB         2289555        * 11/1995

* cited by examiner

*Primary Examiner*—Aung S. Moe
(74) *Attorney, Agent, or Firm*—Oliff & Berridge PLC

(57) ABSTRACT

An information processing apparatus provides simplified operation relating to switching of information input modes in an electronic camera. After photographing a picture image, memo information is input and superimposed onto a previous photographic picture image if input within a prescribed time period, for example, the time period necessary for a compression process of the photographic picture image. The previous photographic picture image is photographed immediately prior and is displayed on the screen. A touch tablet is operated by a pen and functions as an input device. A memo input in this manner is stored to memory as information of the same recording unit as the photographic picture image. After the prescribed time period has elapsed and photography has been performed, if the touch tablet is operated the photographic picture image is erased from the screen and only the memo is input. Also, the input memo is stored independently to memory.

6 Claims, 16 Drawing Sheets

2x2 PICTURE ELEMENT AREA

CCD 20

3x3 PICTURE ELEMENT AREA

CCD 20

INFORMATION PROCESSING APPARATUS HAVING A PHOTOGRAPHIC MODE AND A MEMO INPUT MODE

INCORPORATION BY REFERENCE

The disclosure of the following priority application is herein incorporated by reference: Japanese Patent Application No. 08-270799, filed Oct. 14, 1996.

BACKGROUND OF THE INVENTION

1. Field of Invention

The invention relates to an information processing apparatus. In particular, the invention relates to an information processing apparatus which provides a photographic mode in which objects are photographed and a memo input mode in which memo information, such as line images, is input from a position information input device.

2. Description of Related Art

In recent years, integration technology of semiconductors and implementation technology of electronic circuits have greatly advanced. In conjunction with this advancement, electronic cameras are developing that are capable of not only recording a picture image of a photographed object, but at the same time also recording information concerning sound and memorandum.

With this type of electronic camera, information about the picture of the photographed object, memorandum, and sound are recorded as recording units. The recording units are optimally combined and each is recorded, for example, in a memory. With the type of electronic camera described above, for example, when attempting to write a memo or so forth for a picture image of a photographed object, subsequent to performing photography, there are problems. For example, the operation for switching to the input mode is too complex.

Further, it is necessary to perform a picture image compression process on a photographed picture image. However, during the execution of this type of picture image process, when attempting to input a memo or so forth, for example, it becomes necessary for the CPU (central processing unit) to execute two processes simultaneously in parallel. As a result, the picture image processing time gets longer. Also, if the processing capacity of the CPU in the electronic camera is not very large, the problem of reduced operability occurs.

SUMMARY OF THE INVENTION

The invention is directed to an apparatus which addresses the aforementioned problems. One object of the invention is to improve the operability related to switching to an input mode. Another object of the invention is to provide an information processing apparatus for an electronic camera, for example, which can operate even when the processing capacity of the CPU is not very high.

The information processing apparatus according to the invention includes a mode selection unit which selects a photographic mode and a memo input mode. A control unit controls the mode selection unit. A detection unit detects whether input has occurred based on a position information input device. In the event that the detection unit detects the occurrence of input from the position information input device, and provided the photographic mode is selected by the mode selection unit, the control unit controls the mode selection unit so as to cause it to select the memo input mode.

Further, the information processing apparatus according to the invention includes a photographic mode in which an object is photographed and a memo input mode in which memo information is input from a position information input device. A mode selection unit selects a photographic mode and a memo input mode. A control unit controls the mode selection unit. A detection unit detects whether input has occurred from the position information input device. When the detection unit detects input from the position information input device when the photographic mode is selected by the mode selection unit, the control unit controls the mode selection unit to cause the mode selection unit to select the memo input mode.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
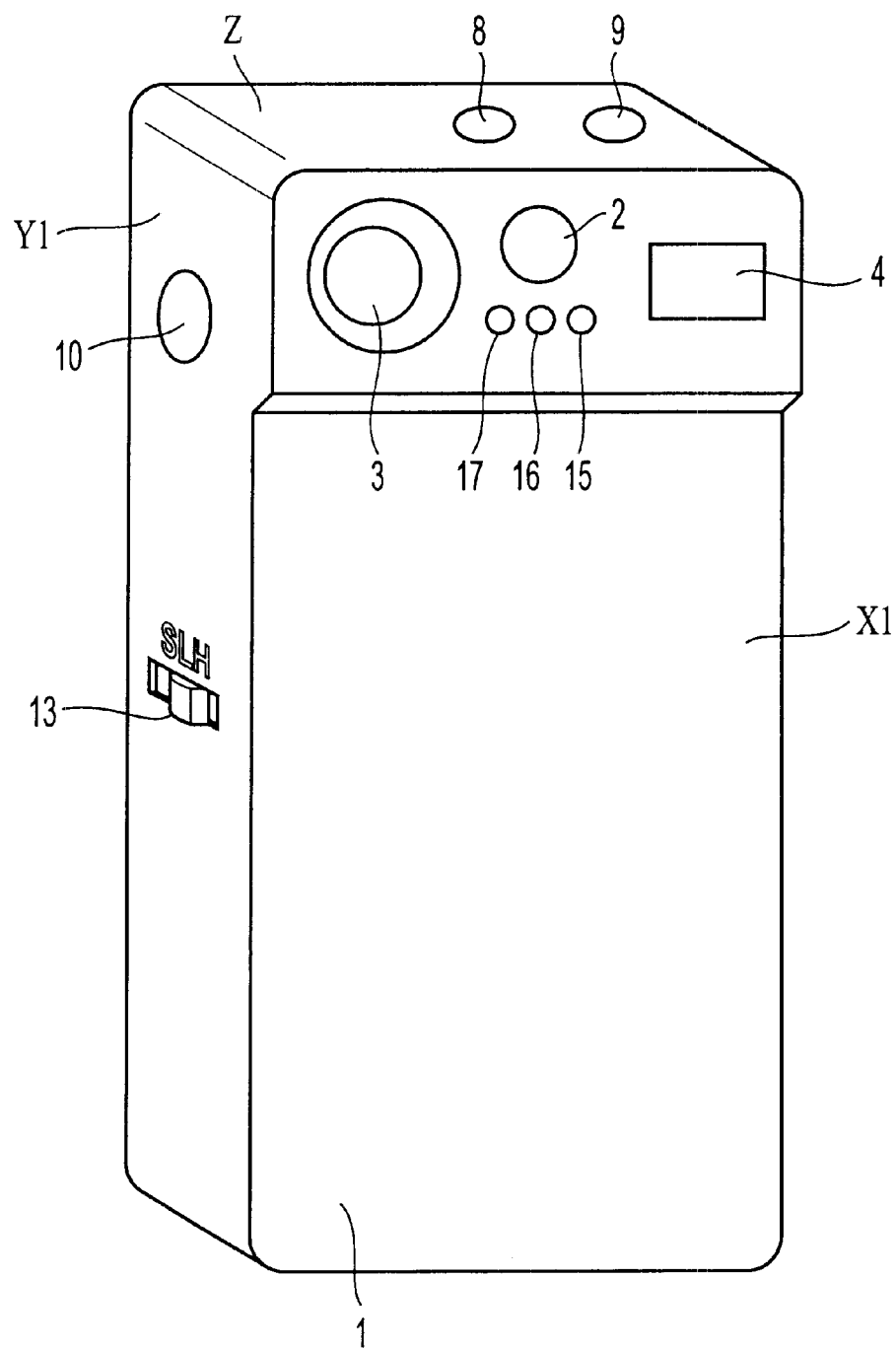
FIG. 1 is a perspective view showing the front of one embodiment of the electronic camera according to the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate like elements.

Figure 2:
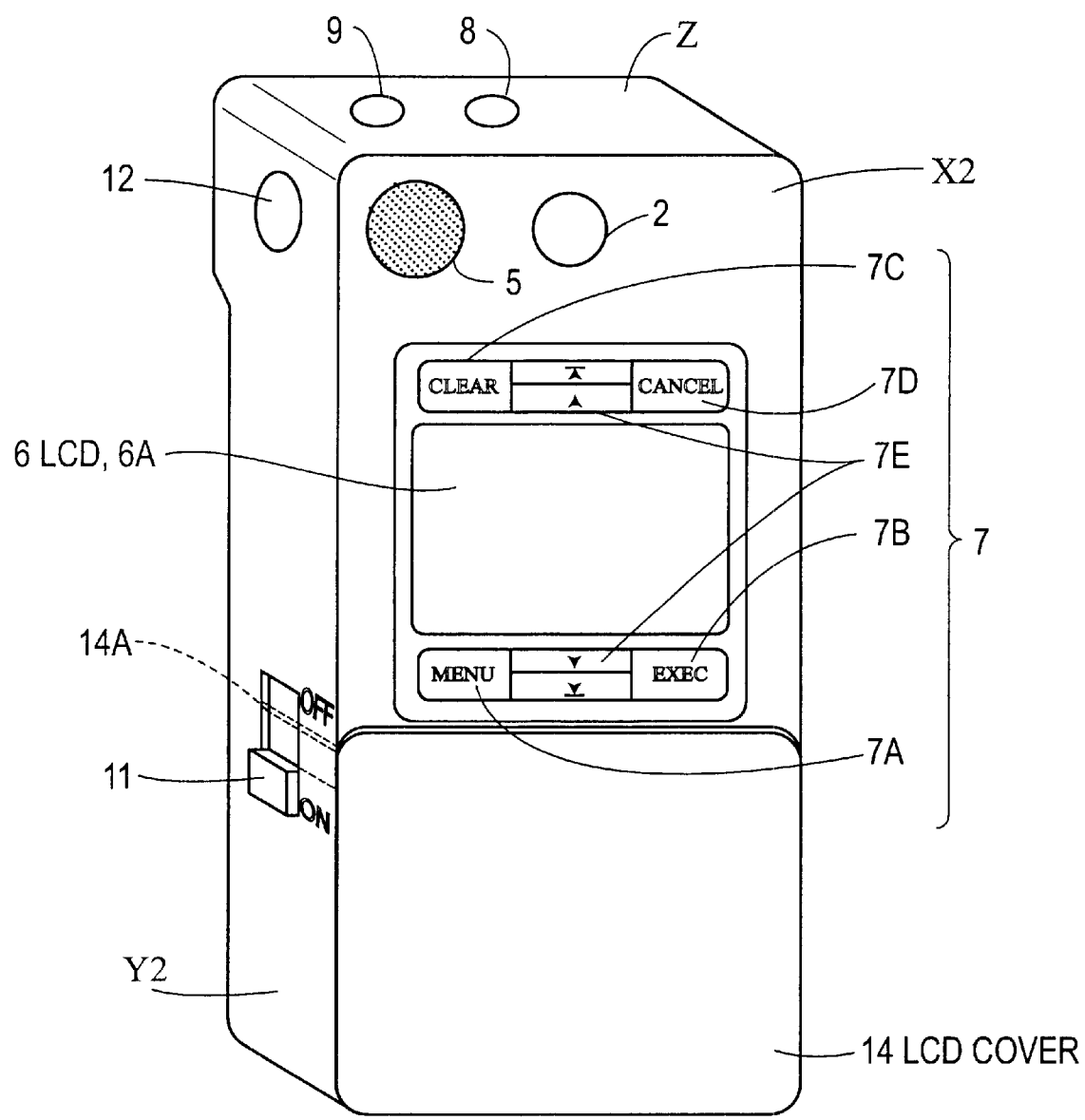
FIG. 2 is a perspective view showing the rear of the electronic camera shown in FIG. 1.

FIGS. 1 and 2 are perspective view figures showing an embodiment of the electronic camera according to the invention. With the electronic camera of the embodiment, when photographing an object, the side facing the photographic object is designated as X1, and the side facing the user is designated as X2. The camera is equipped on the upper portion of the X1 side with a view finder 2. Viewfinder 2 is used to confirm the photographic range of the object to be photographed. Also on the upper portion of the X1 side are the photographic lens 3, which inputs the photographic picture image of the photographed object, and a light emitting component or strobe 4, which emits light to illuminate the object to be photographed.

Figure 4:
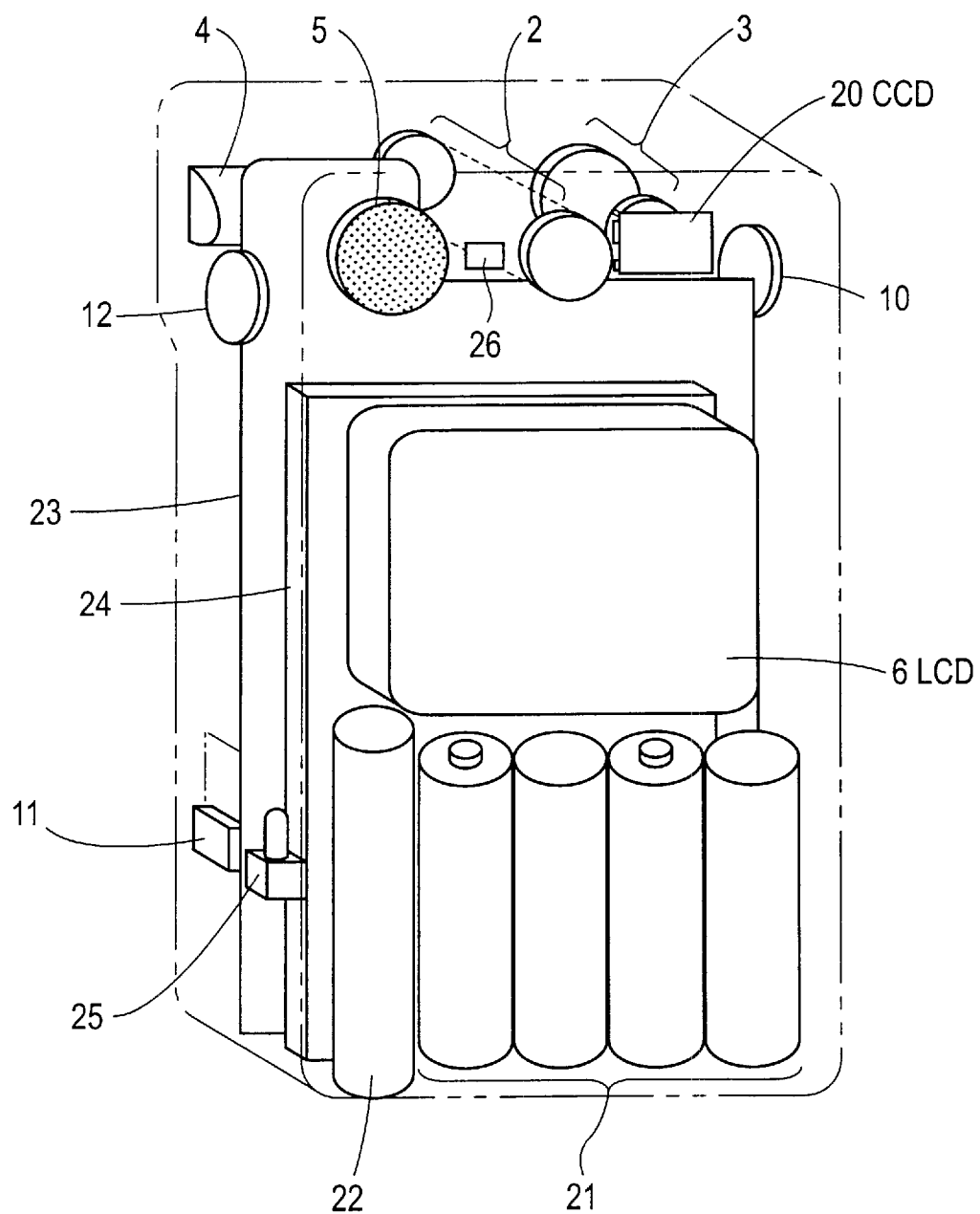
FIG. 4 is a perspective view showing the interior components of the electronic camera shown in FIG. 1 and FIG. 2.

In addition, on the X1 side, a red-eye reduction lamp 15 is attached which reduces red-eye by flashing before the strobe 4 flashes when performing photography using the flashing strobe. Also on the X1 side is a photometric element 16 which performs photometry when the operation of the CCD is stopped, as shown in FIG. 4. A colorimetric element 17 performs colorimetry when the operation of the CCD 20 is stopped.

Thus, on the upper end of the camera on the X1 side are positioned the viewfinder 2, the photographic lens 3 and the light emitting component 4. On the corresponding upper end of the X2 side, which opposes the X1 side, speaker 5 is positioned which outputs audio sound that is recorded in the electronic camera 1 as well as the viewfinder 2. In addition, LCD 6 and operation keys 7, which are formed on the X2 side, are formed directly below the viewfinder 2, photographic lens 3, light emitting component 4, and speaker 5. On the surface of the LCD 6 a touch tablet 6A, which is a detection unit, is arranged which outputs position data corresponding to an indicated position. The touch tablet 6A operates based on contact of a pen-shaped indicator, described hereafter.

Touch tablet 6A is constructed of transparent materials such as resin, for example. The user, using the touch tablet 6A, can observe an image that is displayed on the LCD 6. The LCD is formed on the inner side of the touch tablet 6A.

Operation keys 7 are operated, for example, when recorded data is reproduced and displayed on the LCD 6.

The user, using the touch tablet 6A, is able to view the picture image displayed on the LCD 6 that is formed on the inner side of the touch tablet 6A. The operation keys 7 include the menu key 7A. Menu key 7A is operated when displaying the menu screen on the LCD 6. The execution key 7B is operated when reproducing recorded information selected by the user. The clear key 7C is operated when clearing recorded information. The cancel key 7D is operated when canceling the reproduction process of the recorded information. The scroll key 7E is operated when scrolling the screen in up and down directions when the list of recorded information is displayed on the LCD 6.

Figure 3:
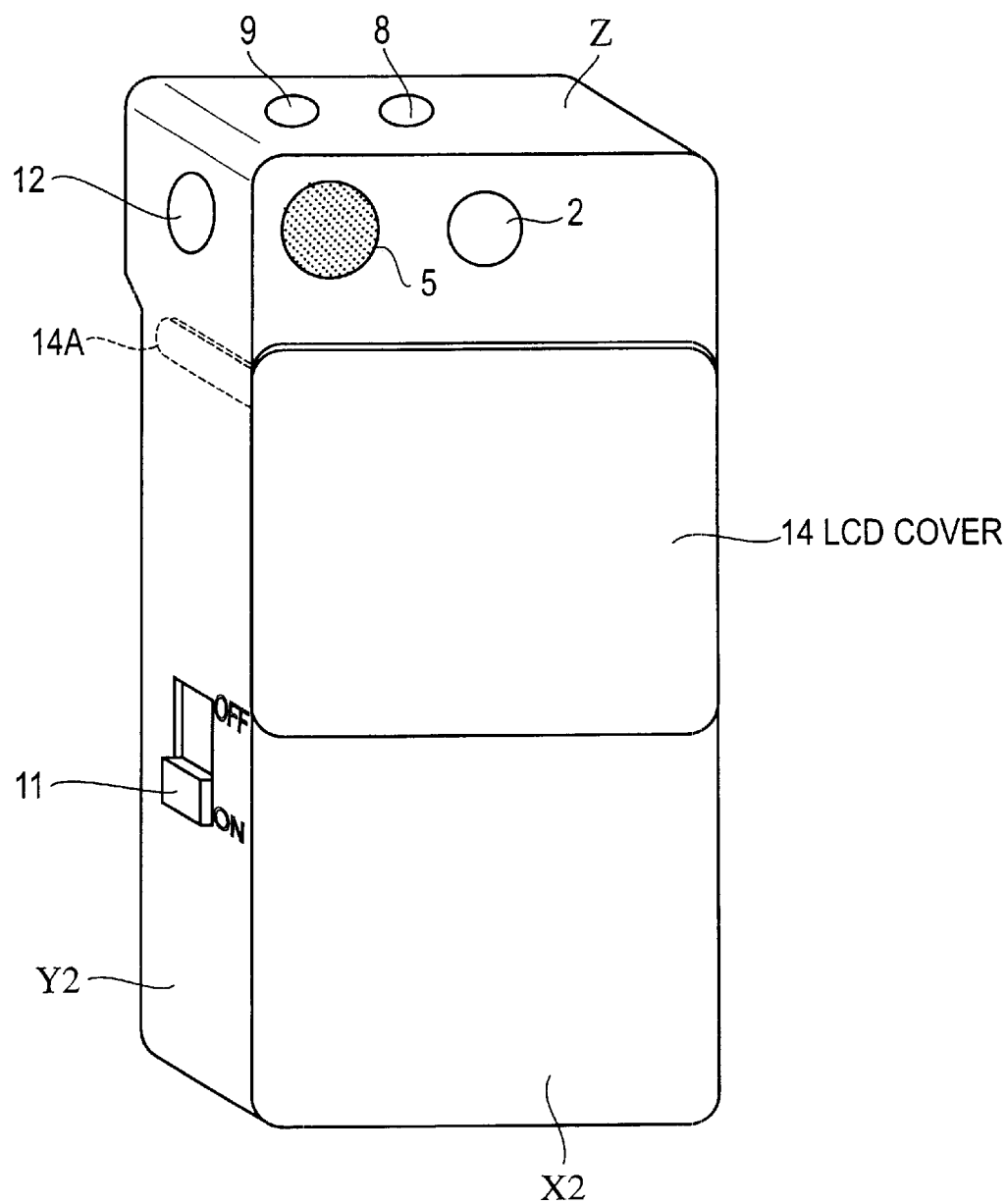
FIG. 3 is a perspective view showing the electronic camera in accordance with the invention with the LCD cover closed.

On the X2 side, the sliding LCD cover 14 is arranged to protect the LCD 6 when the LCD is not in use. The LCD cover 14, when moved in the upward direction as shown in FIG. 3, covers the LCD 6 and the touch tablet 6A. Further, when the LCD cover 14 is moved in the downward direction, in addition to uncovering the LCD 6 and the touch tablet 6A, the power switch 11, described hereinafter, that is arranged on the Y2 side is switched to the on position by arm component 14A of the LCD cover 14.

On the top side of the electronic camera 1, i.e. the Z side, an audio microphone 8, which collects audio sound, is located. An ear phone jack 9 for connecting to ear phones (not shown) is also located on the Z side.

On the left side, i.e. the Y1 side, a release switch 10 is positioned. Release switch 10 is operated when photographing an object. A successive photo mode switch 13, operated when switching to a successive photo mode during photography is also located on the Y1 side. The release switch 10 and the successive photo mode switch 13 are both arranged directly beneath the viewfinder 2, the photographic lens 3 and the light emitting component 4, which are attached to the upper end of the X1 side.

On the Y2 side, i.e. the right side which opposes the Y1 side, are attached the audio recording switch 12, which is operated when recording audio sound, and the power switch 11. The audio recording switch 12 and the power switch 11 are arranged, similar to the aforementioned release switch 10 and the successive photo mode switch 13, directly beneath the viewfinder 2, the photographic lens 3 and the light emitting component 4, which are attached to the upper end of the X1 side. In addition, the audio recording switch 12 is located at nearly the same height as the release switch 10 on the Y1 side. The arrangement provides comfort when the camera is held in either the left hand or right hand.

Also, the height of the audio recording switch 12 and the release switch 10 can be varied to prevent erroneous pressing of a switch arranged on the opposite side thereof. That is, erroneous pressing can result from pressing of a finger on the Y1 side used to off-set the pressing force exerted on a switch on the Y2 side.

When pressing the release switch 10, the successive photo mode switch 13 is used to set the camera for either photography of 1 frame of an object or photography of a predetermined number of frames per unit time when photographing an object. For example, when the indicator needle of the successive photo mode switch 13 is switched to the position where the [S] is printed, i.e. the S mode, only 1 frame of photography occurs when pressing the release switch 10. Further, the indicator needle of the successive photo mode switch 13 may be switched to the position where [L] is printed, i.e. the L mode. In this low speed successive mode, 8 frames per second are performed during the time that the release switch 10 is pressed. Also, the indicator needle of the successive photo mode switch 13 may be switched to the position where the [H] is printed, i.e. the H mode. In this high speed successive mode, 30 frames per second of photography are performed during the time that the release switch 10 is pressed.

Next, the internal components of the electronic camera 1 will be explained. FIG. 4 is a perspective view showing the internal components of the electronic camera 1 shown in FIG. 1 and FIG. 2. The CCD 20 is positioned next to the portion of the photographic lens 3 adjacent the X2 side. In the CCD 20, an image of the photographed object, input through the photographic lens, undergoes photoelectric conversion to an electric signal.

The internal viewfinder display element 26 is arranged within the field of vision of the viewfinder 2. It is arranged so as to display setting states of each type of function for the user to observe when viewing an object through the viewfinder 2. Directly beneath the LCD 6, 4 cylindrical batteries 21, for example dry cell type 3 batteries, are laid side-by-side vertically. Electrical power accumulated in the batteries 21 is supplied to the various parts of the apparatus. Further, a condenser 22 is positioned directly beneath the LCD 6 together with the batteries 21. The condenser 22 accumulates the electric load for emitting the light of the light emitting component 4.

Figure 5:
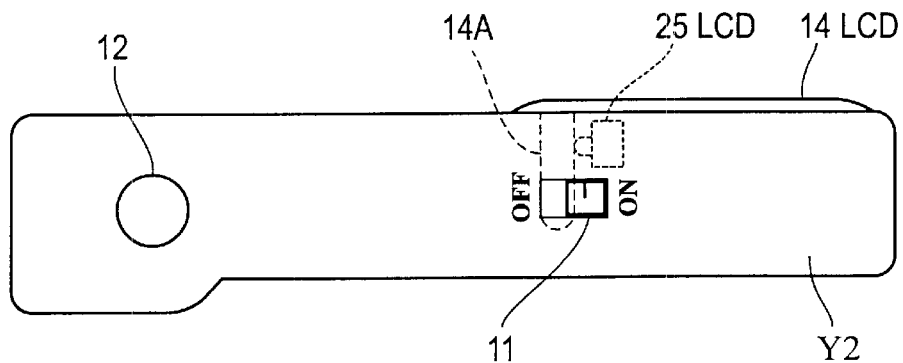
FIGS. 5(a)–5(c) show the relationship between the position of the LCD cover, the power switch, and the LCD switch in accordance with the invention.
Figure 5:
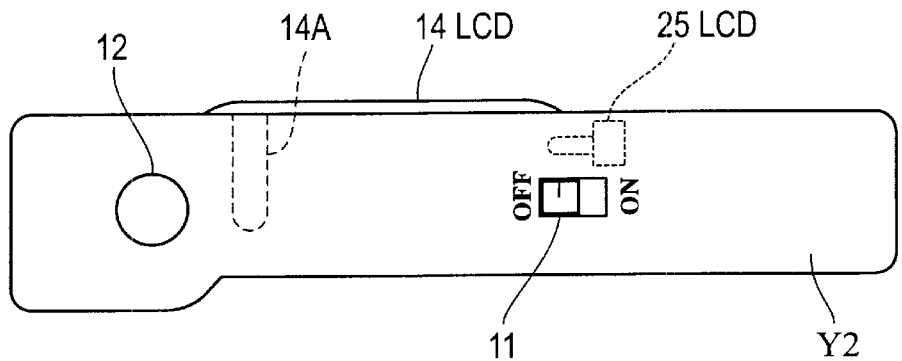
Figure 5:
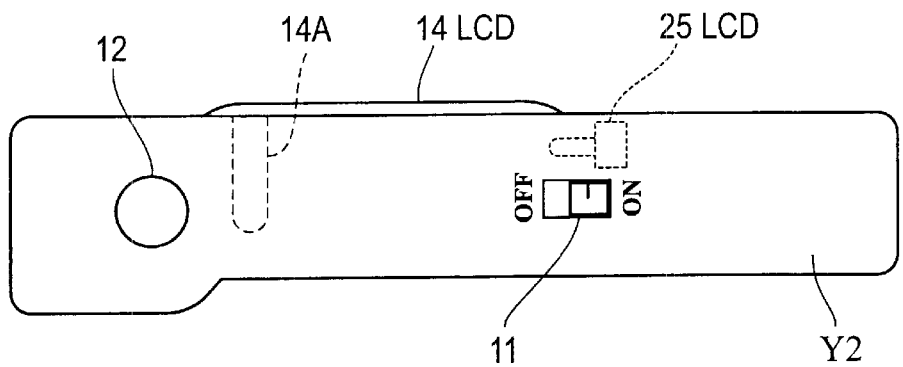

On circuit substrate 23, various types of control circuits for controlling each component of the electronic camera 1 are formed. In addition, between the circuit substrate 23, the LCD 6 and the batteries 21, a removable memory card 24 is positioned. Various information input into the electronic camera 1 is recorded respectively on a predetermined area of the memory card 24. Also, the LCD switch 25, arranged proximate the power switch 11, moves to the ON position only when such protruding component is pressed. When the LCD cover 14 is moved in a directly downward direction, as shown in FIG. 5(*a*), the power switch 11 is switched to the ON position by the arm component 14A of the LCD cover 14.

Further, when the LCD cover 14 is in the direct downward position, the power switch 11 can be operated by the user independently of the LCD switch. For example, if the LCD cover is closed and the electronic camera 1 is not in use, then, as shown in FIG. 5(*b*), the power switch 11 and the LCD switch 25 are both in the OFF position. In this state, when the user switches the power switch 11 to the ON position as shown in FIG. 5(*c*), the power switch 11 moves to the ON position while the LCD switch 25 remains in the OFF position. Meanwhile, as shown in FIG. 5(*b*), when the power switch 11 and the LCD switch 25 are both in the OFF position, and the LCD cover 14 is opened as shown in FIG. 5(*a*), the power switch 11 and the LCD cover switch 25 are in the ON position. Further, when closing the LCD cover, only the LCD switch 25, as shown in FIG. 5(*c*), is switched to the OFF position.

In the present embodiment, the memory card 24 is arranged to be removable. However, the memory may also be arranged on the circuit substrate 23. This allows recording of each type of information into the memory. Further, the memory arrangement may also be set up to allow the various types of information that are recorded in the memory, i.e. in the memory card 24, to be output to an external personal computer through an interface (not shown).

Figure 6:
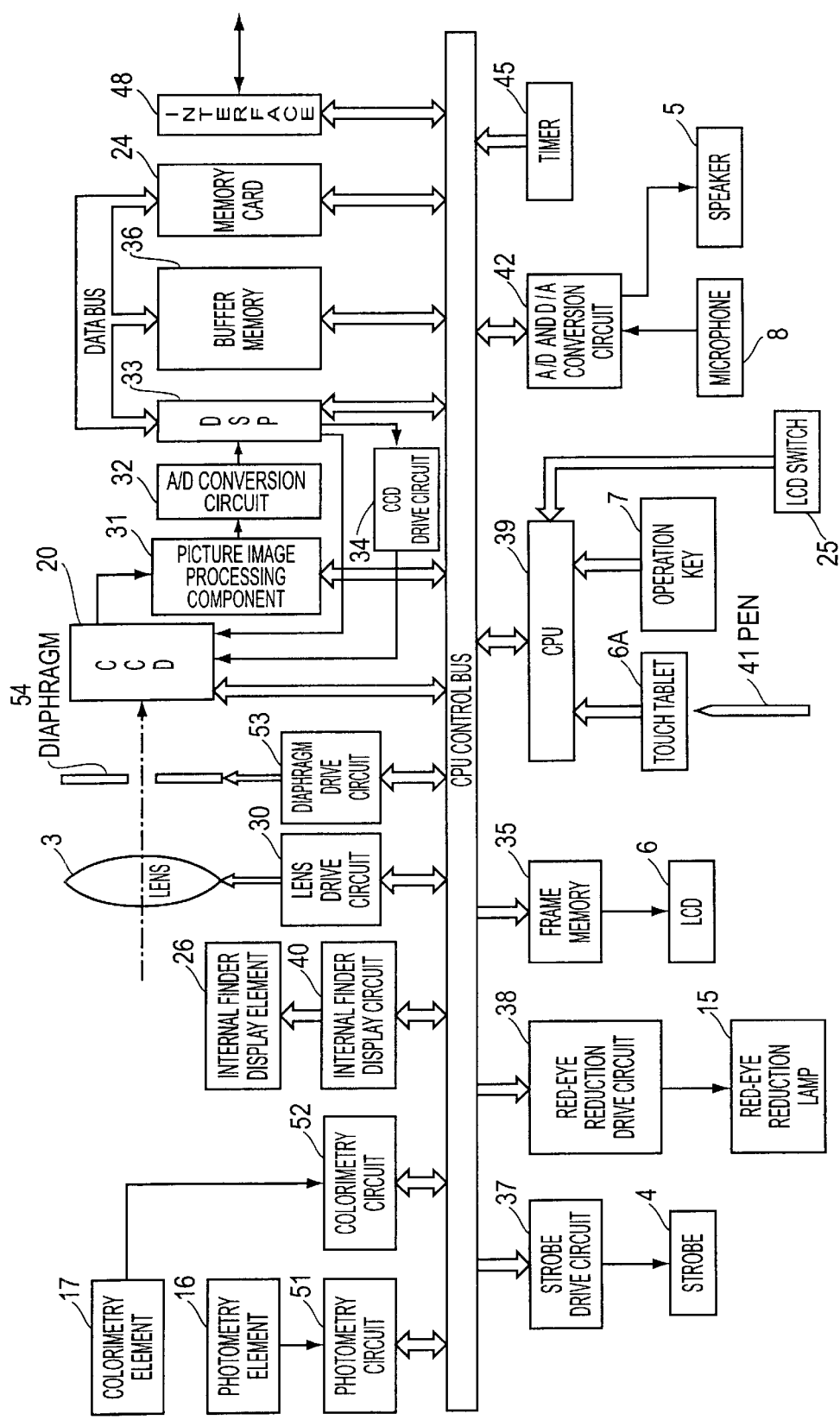
FIG. 6 is a block diagram of the electronic camera shown in FIG. 1 and FIG. 2 in accordance with the invention.

Hereinafter, the internal electrical components of the electronic camera 1 according to the present embodiment will be explained with reference to the block diagram of FIG. 6. The CCD 20, which includes a plurality of picture elements (pixels), performs the photoelectric conversion of the photographed image formed at each picture element into an electronic image signal. The digital signal processor, hereinafter referred to as the DSP 33, supplies a CCD horizontal drive pulse to the CCD 20. The DSP 33 also controls the CCD drive circuit 34 so as to supply a CCD vertical drive pulse to the CCD 20.

The picture image processing component 31 is controlled by the CPU 39 functioning in conjunction with the mode selection unit, the control unit and the detection unit. The CPU performs with predetermined timing and samples image signals that are photoelectrically converted by the CCD 20, and increases the sampled signal to a prescribed level. The analog/digital conversion circuit, hereafter referred to as the A/D conversion circuit 32, converts the sampled picture image signal to a digital signal using the picture image processing component 31, and then supplies it to the DSP 33. The DSP 33 controls the data bus that is connected to the buffer memory 36 and the memory card 24. The DSP 33 temporarily stores picture image data that is supplied from the A/D conversion circuit 32 to the buffer memory 36. The DSP 33 then reads the picture image data stored in the buffer memory 36 and records that picture image data to the memory card 24.

Further, the DSP 33 stores the picture image data that is supplied from the A/D conversion circuit 32 to the frame memory 35. In addition to displaying the picture image data on the LCD 6, DSP 33 reads the photographic picture image data from the memory card 24. After expanding the photographic picture image data, it stores the expanded photographic picture image data to the frame memory 35 and displays it on the LCD 6. In addition, the DSP 33, with activation of the electronic camera 1, functions such that it repeatedly activates the CCD 20 while adjusting the exposure time until the exposure level of the CCD 20 reaches the appropriate value.

The DSP 33 also performs timing processing for data input and output which occurs when recording to the memory card 24 and when storing the post-expansion picture image data to the buffer memory 36. The buffer memory 36 is used to alleviate the difference in processing speeds between the CPU 30 and the DSP 33 as well as the speed of the input and output of the data from the memory card 24. The microphone 8 inputs audio sound, and supplies that audio information to the A/D and D/A conversion circuit 42. The A/D and D/A conversion circuit 42 converts the analog signal that corresponds to the audio sound detected by the microphone 8 to a digital signal and outputs the digital signal to the CPU 39. The A/D and D/A conversion circuit 42 also can convert the digital audio data supplied from the CPU 39 to analog data and then outputs the analog audio signal to speaker 5.

The photometry element 16 measures the amount of light on the photographed object and surroundings. The photometry element 16 then outputs that photometric result to the photometry circuit 51. The photometry circuit 51 performs a prescribed process on the analog signal, which is the photometric result supplied from the photometric element 16. The photometry circuit 51 then converts the analog signal to a digital signal and outputs that digital signal to the CPU 39.

The colorimeter element 17 measures the color temperature of the photographed object and its surroundings. The calorimeter element 17 then outputs such photometric results to the colorimetry circuit 52. The colorimetry circuit 52, after performing a prescribed process on the analog signal that is the colorimetry result supplied from the calorimeter element 17, converts the analog signal to a digital signal and outputs the digital signal to the CPU 39.

The timer 45 has an internal time measurement circuit and outputs data corresponding to the current time to the CPU 39. The diaphragm drive circuit 53 sets the aperture diameter of the diaphragm 54 to a prescribed value. The diaphragm 54 is arranged between the photographic lens 3 and the CCD 20 and changes the aperture of incident light entering the CCD 20 from the photographic lens 3.

The CPU 39, based on the signal from the LCD switch 25 when the LCD cover 14 is open, stops action of the photometry circuit 51 and the calorimeter circuit 52. When the LCD cover is closed, in addition to operating the photometry circuit 51 and the colorimeter circuit 52, the CPU 39 stops action of the CCD 20, for example electronic shutter action, until the release switch is in the half-depressed state, i.e. performing the first operation. The CPU 39, while stopping the action of the CCD 20, controls the photometry circuit 51 and the calorimeter circuit 52. In addition to receiving photometry results from the photometry element 16, the CPU 39 receives the colorimetry results from the calorimeter element 17.

Further, the CPU 39, upon referencing a prescribed table, computes the white balance adjustment value which corresponds to the color temperature supplied from the colorimeter circuit 52. The CPU 39 then supplies such white balance adjustment value to the picture image processing component 31. In other words, when the LCD cover 14 is closed, the LCD 6 cannot be used as an electronic viewfinder. Accordingly, action of the CCD 20 is stopped. Since the CCD 20 consumes a large amount of electricity, the electric power of the batteries 21 can be conserved by stopping the action of the CCD 20 in this way. Further, when the LCD cover 14 is closed the CPU 39 controls the picture image processing component 31 so that the picture image processing component 31 does not perform each of the processes until the release switch 10 is pressed half-way, i.e. until the release switch 10 is in the half-pressed state. In addition, when the LCD cover 14 is closed, the CPU 39 controls the diaphragm drive circuit 53 so that the diaphragm drive circuit 53 does not perform any action such as changing the aperture diameter of the diaphragm 54 until the release switch 10 is depressed half-way, i.e. until the release switch 10 is in the half-depressed state. The CPU 39 causes the strobe 4 to create the appropriate flash by controlling the strobe drive circuit 37. The CPU 39 also causes the red-eye reduction lamp 15 to flash the appropriate flash prior to flashing the strobe 4. The red-eye reduction lamp 15 is controlled by the red-eye reduction lamp drive circuit 38.

Moreover, when the LCD cover 14 is open, i.e. when the electronic viewfinder is in use, the CPU 39 does not cause the strobe to flash. By arranging the apparatus in this way, it becomes possible to photograph an object in the picture image state displayed in the electronic viewfinder. Based on the date and time data supplied from the timer 45, the CPU 39 records the photographic date and time information into the photographic picture image recording area of the memory card 24 as header information of the photographic image data. In other words, the photographic date and time data are attached to photographic picture image data which is recorded to the photographic picture image recording area of the memory card 24.

Further, after compressing the digitized audio information, the CPU 39 records the digitized and compressed audio data to a prescribed area, the audio recording area of the memory card 24, after temporarily storing it in the buffer memory 36. At that time, data of the sound recording time and date is recorded to the audio recording area of the memory card 24 as audio data header information. In addition to controlling the lens drive circuit 30 to perform the auto-focus movement by moving the photographic lens 3, the CPU 39 also causes the aperture diameter of the diaphragm 54 to change by controlling the diaphragm drive circuit 54. Diaphragm 54 is arranged between the photographic lens 3 and the CCD 20. Also, CPU 39 causes the setting for each type of action to be displayed on the internal viewfinder display element 26 by controlling the internal display circuit 40.

The CPU 39 further provides for the reception of an external device (not shown) as well as the input of data through the interface (I/F) 48. Further, the CPU 39 receives signals from operation keys 7 and based thereon completes appropriate processing.

When a location, i.e. a position, on the touch tablet 6A is compressed by a pen-shaped indicator member operated by the user, CPU 39 reads X-Y coordinates of the location where the touch tablet 6A is compressed. The coordinate data, hereafter described as memo information is accumulated in the buffer memory 36. Further, the CPU 39 has the ability to record the memo information that is accumulated in the buffer memory 36, as well as the header information of the memo information input date and time. This information is recorded using the memo information area of the memory card 24.

Hereafter, types of operation of the electronic camera 1 of the present embodiment will be explained. First, operation of the electronic viewfinder occurring in the LCD 6 of the invention will be described. When the user places the release switch 10 in a half-depressed state, the DSP 33 is supplied with a signal from the CPU 39. Based on the value of the signal, which corresponds to the state of the LCD switch 25, it is determined whether the LCD cover 14 is open. If the LCD cover 14 is determined to be closed, then the electronic viewfinder operation is not performed. In this case, the DSP 33 stops the process until the release switch 10 is operated.

Further, when the LCD cover 14 is closed, since the electronic viewfinder operation is not performed, the CPU 39 stops the actions of the picture image processing component 31 and the diaphragm drive circuit 53. Further, the CPU 39, instead of stopping the CCD 20, operates the photometric circuit 51 and the calorimeter circuit 52. The measured results obtained thereby are supplied to the picture image processing component 31. The picture image processing component 31 uses the values of these measured results when performing white balance control and control of the luminance value. Further, when operating the release switch 10, the CPU 39 performs the operations for the CCD 20 and the diaphragm drive circuit 53.

However, if the LCD cover 14 is open, the CCD 20 performs the electronic shutter action in a prescribed exposure time at each prescribed time. A light picture image of the photographed object gathered by the photographic lens 3 is photoelectrically converted. The picture image signal obtained by this operation is output to the picture image processing component 31. The picture image processing component 31 controls the white balance control and the control of the luminance value. Subsequent to performing the prescribed processes to such picture image signals, the picture image signals are output to the A/D conversion circuit 32. Further, when operating the CCD 20, the picture image processing component 31, by utilizing the CPU 39, uses the adjustment values which are used in the white balance control and the luminance value control. These adjustment values are calculated using the output of the CCD 20. The DSP 33 outputs the picture image data to the frame memory 35, and displays the picture image that corresponds to such picture image data on the LCD 6.

In this manner, when the LCD cover 14 is open in the electronic camera 1 of the invention, the CCD 20 operates the electronic shutter at a prescribed time interval. Each time this occurs, the signal output from the CCD 20 is converted to picture image data. This picture image data is output to the frame memory 35. The electronic viewfinder operation is performed by the picture image of the photographic object being temporarily displayed on the LCD 6.

Further, as described above, in the case when the LCD cover 14 is closed, the electronic viewfinder operation is not performed. As a result, activity of the CCD 20, picture image processing component 31, and diaphragm drive circuit 53 are stopped. Electrical consumption is thereby conserved.

Next, photography of an object in accordance with the invention will be described. Firstly, explanation will be provided with regard to the case that the successive photo mode switch 13, which is positioned on the Y1 side, is switched to the S mode. The S mode photographs only 1 frame at a time. Initially, as shown in FIG. 1, power to the electronic camera 1 will be turned on by switching the power switch 11 to the side where "ON" is printed. The object to be photographed is confirmed through the viewfinder 2. When the release switch 10, which is arranged to the Y1 side, is pressed, then the process of photographing the object is initiated.

Further, when the LCD cover 14 is closed and when the release switch 10 is in the half-depressed state, the CPU 39 causes operation of the CCD 20, the picture image processing component 31 and the diaphragm drive circuit 53. When the release switch 10 is in the fully pressed state, the state of performing the second operation, then the photography process of the object is initiated.

The photographic picture image of the photographed object observed through the viewfinder 2 is collected and image formation occurs on the CCD 20. This provides a plurality of picture elements. The photographic picture image of the photographed object formed on the CCD 20 is photo-electrically converted to a picture image signal at each picture element where a sampling is provided by the picture image processing component 31. The picture image signal that was sampled by the picture image processing component 31 is supplied to the A/D conversion circuit 32 where it is digitized and then output to the DSP 33.

The DSP 33, after temporarily outputting the picture image data to the buffer memory 36, then reads the picture image data from the buffer memory 36. Then, the DSP 33 compresses the picture image data according to the JPEG (Joint Photographic Experts Group) method. This method combines discrete cosine transformation, quantization and Huffman encoding. The picture image data is thereby recorded to the photographic picture image recording area of the memory card 24. At this time, the photograph date and time are recorded to the photographic picture image recording area of the memory card 24 as header information of the photographic picture image data.

When the successive photo mode switch 13 is switched to the S mode, only 1 frame is photographed. Thus, even if the release switch 10 is pressed successively, photography will not be performed in excess of the one frame. Further, if the release switch 10 is pressed continuously and if the LCD cover 14 is open, the photographic picture images will be displayed on LCD 6.

Hereinafter, explanation will be provided with regard to the condition when the successive photo mode switch 13 is switched to the L mode. The L mode is the mode that photographs 8 frames per second successively. The power is turned on to the electronic camera 1 by switching the power switch 11 to the side that has "ON" printed. When the release switch 10, which is arranged on the Y1 side, is pressed, the process of photographing an object is initiated. Moreover, when the LCD cover 14 is closed and the release switch 10 is in the half-depressed state, the CPU 39 causes operations of the CCD 20, the picture image processing component 31 and the diaphragm drive circuit 53. When the release switch 10 is in the fully pressed state, then photography of an object is initiated.

The photographic picture image of an object observed through the viewfinder 2 is collected and image formation occurs on the CCD 20. The image formation provides a plurality of picture elements. The photographic picture image of the object formed on the CCD 20 is photoelectrically converted to a picture image signal at each picture element where a sampling, at a ratio of 8 times per 1 second, is provided by the picture image processing component 31. Further, the picture image processing component 31 thins 3/4 of the picture image electric signals from among the total number of picture elements of the CCD 20.

Figure 7:
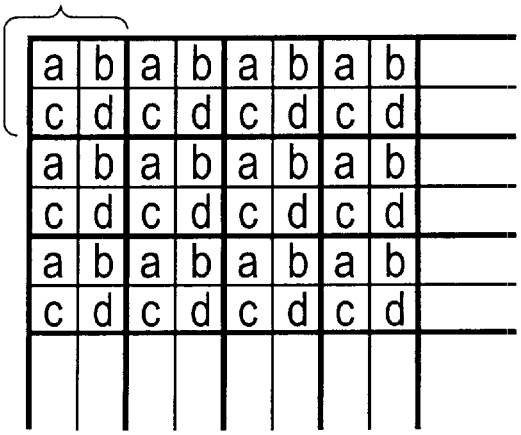
FIG. 7 shows the process for thinning the picture elements in the L mode in accordance with the invention.

To explain, the picture image processing component 31, as shown in FIG. 7, divides the picture elements of the CCD 20, which are arranged in a matrix, into areas of 2×2 picture elements, i.e. 4 pixels. By this process, a sampling is taken of the picture image signal for 1 picture element located in a predetermined position in each 2×2 area. The remaining 3 picture elements are ignored (also known as thinning). For example, at the time of the first sampling (the first frame), picture element a of the top left of each area is selected for sampling while the remaining picture elements b, c and d are ignored. At the time of the second sampling (the second frame), the picture element b of the top right of each area is selected for sampling while the remaining picture elements a, c and d ignored. Thereafter, for the 3rd and fourth times of sampling, the picture element c of the bottom left and the picture element d of the bottom right are selected for sampling, respectively in turn, and the remaining picture elements are ignored. In other words, each picture element is selected for sampling every 4 frames.

The picture image signal that is sampled by the picture image processing component 31, i.e. the picture image signal of 1/4 of the picture elements of the total number of picture elements on the CCD 20, is supplied to the A/D conversion circuit 32 where it is digitized and output to the DSP 33. The DSP 33, after temporarily outputting the digitized picture image signal to the buffer memory 36, reads the picture image signal. After compressing the picture image according to the JPEG method, the DSP 33 records the digitized and compressed photographic picture image data into the photographic picture image recording area of the memory card 24. At this time, photography date and time data are recorded to the photographic picture image recording area of the memory card 24 as header information of the photographic picture image data.

Explanation will hereinafter be provided with regard to the condition that the successive photo mode switch 13 is switched to the H mode. The H mode is the mode that photographs 30 frames per second successively. Power to the electronic camera 1 will be turned on by switching the power switch 11 to the side where "ON" is printed. When the release switch 10, which is arranged to the Y1 side, is pressed, then the process of photographing an object is initiated.

Moreover, when the LCD cover 14 is closed and the release switch 10 is in the half-depressed state, the CPU 39 causes operations of the CCD 20, the picture image processing component 31 and the diaphragm drive circuit 53 to reopen. When the release switch 10 is in the fully pressed state, then photography of an object is initiated.

Figure 8:
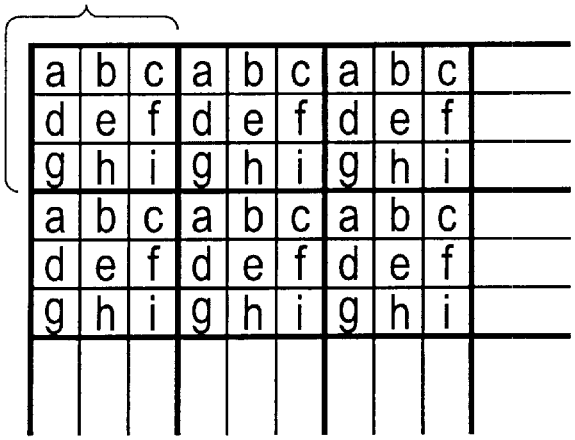
FIG. 8 shows the process for thinning the picture elements in the H mode in accordance with the invention.

The photographic picture image of the object observed through viewfinder 2 is collected and image formation occurs on the CCD 20. The CCD includes a plurality of picture elements. The photographic picture image of the object formed on the CCD 20 is photo-electrically converted to a picture image signal. A sampling at a ratio of 30 times per 1 second is performed by the picture image processing component 31. Further, at this time, the picture image processing component 31 thins (ignores) 8/9 of the picture image electric signals from among the total number of picture elements of the CCD 20. To explain further, the picture image processing component 31, as shown in FIG. 8, divides the picture elements of the CCD 20, which are arranged in a matrix, into areas of 3×3 picture elements. By this process, a sampling is taken of the picture image electronic signal at a ratio of 30 times per 1 second from that one area. The sampling is taken from 1 picture element that is arranged in a predetermined position. The remaining 8 picture elements are ignored.

For example, at the time of the first sampling (the first frame), the picture element a of the top left of each area is selected for sampling while the remaining picture elements b through i are ignored. At the time of the second sampling (the second frame), the picture element b which is arranged to the immediate right of picture element a is selected for sampling while the remaining picture elements a and c through i are ignored. Thereafter, for the 3rd and fourth sampling times, the picture element c and the picture element d and so forth are selected for sampling, respectively in turn, and the remaining picture elements are ignored. In other words, each picture element is selected for sampling every 9 frames.

The picture image signal that is sampled by the picture image processing component 31, i.e. the picture image signal of 1/9 of the picture elements of the total number of picture elements on the CCD 20, is supplied to the A/D conversion circuit 32. The A/D conversion circuit digitizes and outputs the picture image signal to the DSP 33.

The DSP 33 performs the above described process on the digitized picture image signal before outputting the digitized picture image signal to the compression/expansion circuit 34. The compression/expansion circuit 34 performs the compression process on the picture image signal according to the JPEG method. Thereafter, the compression/expansion circuit 34 adds the photography date and time, that is supplied from the timer 45, as header information and records the information to the photographic picture image recording area of the memory card 24. The DSP 33, after temporarily outputting the digitized picture image signal to the buffer memory 36, reads the picture image signal. After compressing the picture image signal according to the JPEG method, the DSP 33 attaches header information of the time and date of photography. Then, the DSP 33 records the digitized and compressed photographic picture image data into the photographic picture image recording area of the memory card 24.

Hereinafter, explanation will be provided of the operation when two dimensional information, i.e. pen input information, is input using the touch tablet 6A. When the touch tablet 6A is pressed with the point of the pen 41, X-Y coordinates of the point of contact are input into the CPU 39. These X-Y coordinates are stored in the buffer memory 36. The data is written to the location that corresponds to each point of the X-Y coordinates that are in the frame memory 47. The memo, corresponding to the contact with the pen 41, can be displayed on the LCD 6.

As described above, since the touch tablet 6A is formed out of transparent materials, the user has the ability to view the points that are displayed on the LCD 6, i.e. the positions that are pressed upon by the pen tip. Further, the touch tablet 6A is capable of determining if there is direct pen input on the LCD 6. Further, when moving the pen 41 on the touch tablet 6A, a line which corresponds to the movement of the pen 41 is depicted on the LCD 6. In addition, if the pen 41 is moved intermittently on the touch tablet 6A, a broken line corresponding to the movement of the pen 41 is displayed on the LCD 6. In so doing, the user has the ability to input desired memo information such as drawings or letter characters using the touch tablet 6A positioned on LCD 6.

When the photographic picture image on the LCD is displayed, the memo information can be input by the pen 41. Thereby, the memo information is integrated with the photographic picture image information in the frame memory 35. The arrangement allows the memo information to be displayed on the LCD 6. Also, the user can select the color of the line image indicated on the LCD 6 from among the colors of black, white, red, blue, for example, by operating the pallet 100 shown in FIG. 14.

The memo information is input to the touch tablet 6A using pen 41. Thereafter, when the execution key 7B is pressed, from among the other operation keys 7, the memo information that is accumulated in the buffer memory 35 is supplied to the memory card 24 in addition to the header information regarding input date and time. Such information is thereby recorded to the memo information recording area. Also, the memo information that is recorded in the memory card 24 includes the information that has undergone the compression process. The memo information input into the touch tablet 6A may include much information with a high spatial frequency content. As a result, when performing the compression process using the aforementioned JPEG method, used in the aforementioned compression of the photographic picture image, the compression efficiency is poor. Also, since the amount of information does not decrease, the time required for compression and expansion becomes longer. In addition, since compression with the JPEG method is lossey, the method is not conducive to the compression of memo information which includes only a small amount of information. This is due to gathering, which accompanies the lack of information, and the blurring that stands out when expanding and displaying on the LCD 6.

Therefore, in the present embodiment, memo information is compressed by the run-length method used in facsimile machines, for example. The run-length method scans the line image surface in the horizontal direction and encodes the continuous length for each color information such as black, white, red, blue, for example. The lengths of each continuous non-information, i.e. portions where there are no pen inputs, are also scanned and encoded thereby allowing the line image to be compressed. By using the run-length method, effective compression of memo information becomes possible. Further, it becomes possible to control the lack of information even when expanding memo information that has been compressed. Moreover, in the situation when the amount of memo information is comparatively small, the arrangement can be set so as to not compress.

As described above, when the photographic picture image is displayed on the LCD 6, when performing pen input, the photographic picture image data and the line image data of the pen input are integrated into the frame memory 35. Also, the integrated image of the photographic picture image and the line image is displayed on the LCD 6. Also, the photographic picture image data is recorded to the photographic picture image recording area and the line information is recorded to the memo information recording area of the memory card 24. In this manner, since two forms of information are recorded in respectively different areas, the user can erase any one of the picture images, for example the memo, from the integrated images of the photographic picture image and the memo. Additionally, the user can also compress the various image information using individual compression methods.

Figure 9:
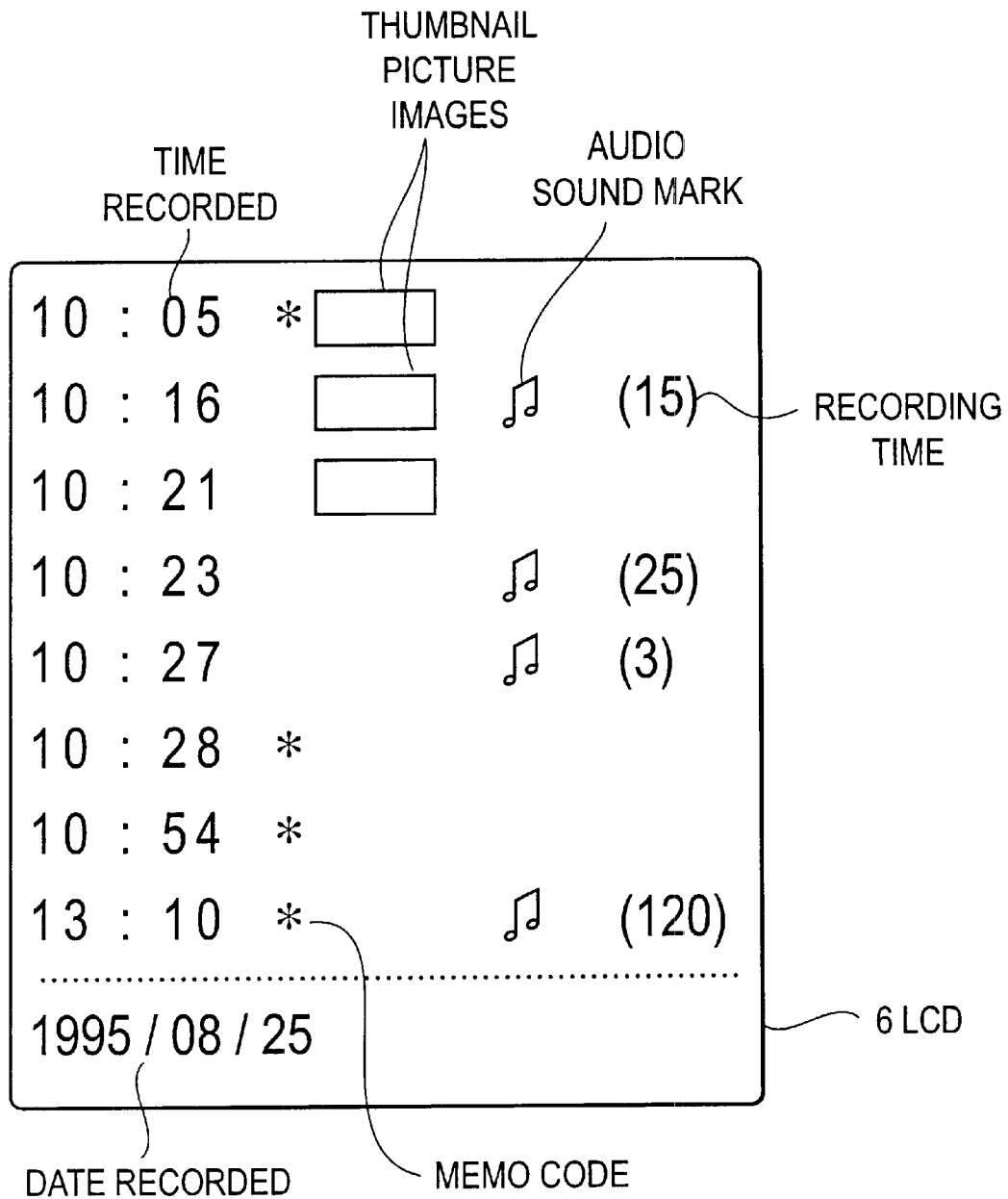
FIG. 9 shows an example of the display screen of the electronic camera shown in FIG. 1 and FIG. 2 in accordance with the invention.

When recording data to the audio recording area, the photographic picture image recording area, or the memo information recording area of the memory card 24, as shown in FIG. 9, a predetermined display is given on the LCD 6. With the display example on the LCD screen 6 shown in FIG. 9, the recording date of the information, illustratively Aug. 25, 1995, is displayed on the lower portion of the screen. The recording time of the information is displayed in the left-most edge of the screen.

A thumbnail image is displayed to the right side of the recording time. This thumbnail image is created by thinning, or reducing, the bitmap data for each image data of the photographic picture image data recorded to the memory card 24. The information shown in this display includes the photographic picture image. In other words, the photographic picture image information is included in the information recorded, i.e. input, at "10:05", "10:16", and "10:21". Picture image information recorded at other times is not included. Further, the memo-code "*" indicates that the prescribed memo is recorded as line image information.

An audio sound mark is displayed to the right side of the display area of the thumbnail image. On the farther right side of the display area, the sound recording time in seconds is shown. When there is no audio information input, the audio sound mark is not displayed.

The user can selectively designate the information to reproduce by pressing one portion of the desired audio sound mark of the LCD 6 with the pen tip of the pen 41, as shown in FIG. 9. By pressing the execution key 7B, shown in FIG. 2, with the pen tip of the pen 41, the user can reproduce the selected information. For example, when the audio sound mark displayed on the "10:16" shown in FIG. 9 is pressed using the pen 41, the CPU 39 reads the audio data, corresponding to the selected sound recording date and time (10:16), from the memory card 24. After expanding the audio data, the CPU 39 supplies the audio data to the A/D and D/A conversion circuit 42. The A/D and D/A conversion circuit 42, after converting the supplied audio data to analog data, reproduces the audio data through the speaker 5.

When reproducing photographic picture image data recorded in the memory card 24, the user selects the information by pressing the desired thumbnail image with the pen tip of the pen 41. The selected information can be reproduced by pressing the execution key 7B. The CPU 39 commands the DSP to read the photographic picture image data, corresponding to the selected photograph date and time, from the memory card 24. The DSP 33 expands the compressed photographic picture image data read from the memory card 24. This photographic picture image data is accumulated in the frame memory 35 as bitmap data and displayed on the LCD 6.

The image photographed in the S mode is displayed on the LCD 6 as a static image. This static image is a reproduced image of the picture image signal of all the picture elements of the CCD 20. The image photographed in the L mode is displayed successively on the LCD 6 in a ratio of 8 frames per second. At this time, the number of picture images displayed in each frame is 1/4 of the total number of picture elements of the CCD 20.

Since human vision reacts with sensitivity to the deterioration of static image resolution, thinning of picture elements of a static image is thought to result in deterioration of the picture image quality to the user. However, when the successive photo speed at the time of photography is increased and 8 frames are photographed in 1 second in the L mode, the picture images are reproduced at a speed of 8 frames per 1 second. Thus, the number of picture elements for each frame become 1/4th of the number of picture elements of the CCD. Since the human eye views 8 frames per 1 second, the amount of information entering the human eye in 1 second becomes twice that of a static image.

In other words, if the number of picture elements for 1 frame of an image photographed in the S mode were 1, then the number of picture elements for 1 frame of an image photographed in the L mode would become 1/4. When a static image that is photographed in the S mode is displayed on the LCD 6, the amount of information entering the human eye in 1 second becomes 1 (number of picture elements 1×number of frames 1). Also, when an image that is photographed in the L mode is displayed on the LCD 6, the amount of information that enters the human eye in one second becomes 2 (number of picture elements 1/4×number of frames 8). In other words, twice as much information as compared to a static image enters the human eye. Accordingly, even if the number of picture elements within 1 frame were to be 1/4th when reproduced, the user is still able to view the reproduced images without noticing much deterioration of the image quality.

Additionally, with the present embodiment, a sampling is taken of different picture elements for each frame. Since those picture elements from the sampling are displayed on the LCD 6, an after-image effect of the human eye occurs. Thus, even if 3/4th of picture elements per frame are thinned, the user can still view the images photographed in the L mode that is displayed on the LCD 6 without noticing much deterioration of the image quality.

In addition, images photographed in the H mode are displayed successively at a ratio of 30 frames per 1 second. Specifically, the number of picture elements displayed for each frame are 1/9 of the total number of picture elements in the CCD 20. However, for the same reason as with the L mode described above, the user can view the images photographed in the H mode that are displayed on the LCD 6 without noticing much deterioration of the image quality.

In the present embodiment, the picture image processing component 31 thins the picture elements of the CCD 20 to the extent that the deterioration of the image quality is not noticed when reproduced when photographing an object in the L mode and the H mode. As a result, the load of the DSP 33 can be reduced, and the DSP 33 can be operated at a low speed and low voltage. In addition, low cost and low energy consumption of the device is made possible.

In the present embodiment as described above, it is possible to record memo, i.e. line image information, without photographing a light image of an object. In the present embodiment, photographic mode and memo input mode are modes that input these types of information. These modes can be selected appropriately according to the operation of the user so as to ensure smooth execution of input information.

Figure 10:
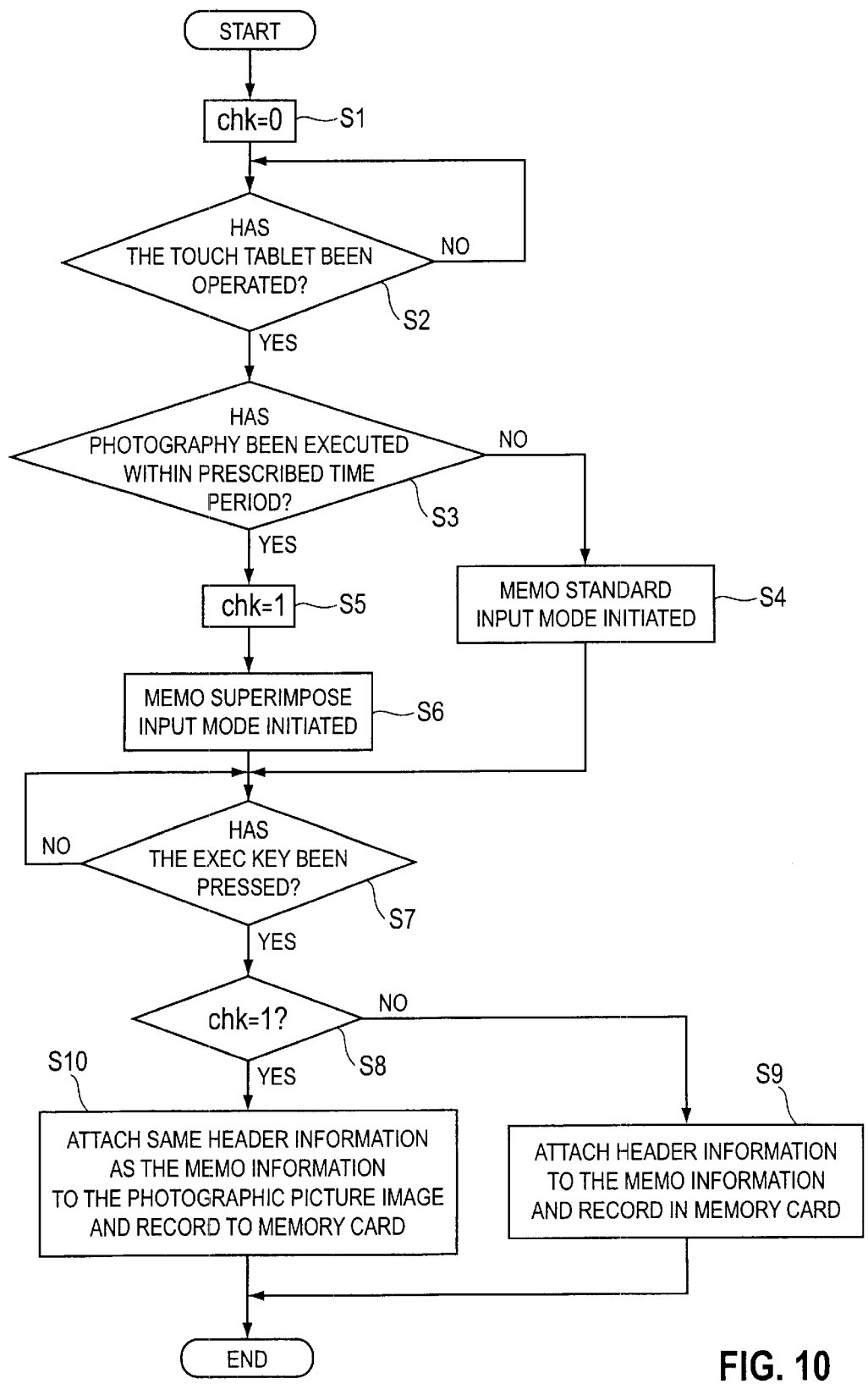
FIG. 10 is a flow chart showing one example of a process executed in the electronic camera shown in FIG. 1 in accordance with the invention.

FIG. 10 is a flow chart that explains an example of the process executed in the present embodiment. First, when turning on the power by operating the power switch 11 of the electronic camera 1, the photographic mode appears. Also, the picture image output from the CCD 20 is displayed on the LCD 6. Further, the CPU 39 executes the process shown in FIG. 10. When this process is executed, the CPU 39 of the electronic camera 1 sets the initial setting of the variable chk to "0". Then the CPU proceeds to step S2. In step S2, the CPU 39 determines whether the touch tablet 6A has been operated. If it is determined (NO), that the touch tablet 6A has not been operated, the CPU returns to step S2 where it repeats the same process until the touch tablet 6A is operated. If it is determined (YES), that the touch tablet 6A has been operated, then the program proceeds to step S3.

In step S3, the CPU 39 determines whether photography has been executed within a prescribed time period, for example, within 5 seconds. If it is determined (NO), that the photography has not been executed within the prescribed time period, the program proceeds to step S4. Then, after initiating memo standard input mode, to be described hereafter, the program proceeds to step S7. If it is determined (YES), that the photography has been executed within the prescribed time period, then the program proceeds to step S5. In step S5, the CPU 39 substitutes "1" for the variable chk, and proceeds to step S6. In step S6, the CPU 39 initiates the memo superimpose input mode, described hereafter, and proceeds to step S7.

In the memo standard input mode, a memo is input independently from the photographic picture image. In the memo standard input mode, the background color for the LCD 6 becomes blue, and the input memo is stored in the memory card 24 after independent header information is attached. The memo superimpose input mode is the mode in which it becomes possible to write over, i.e. superimpose, a memo related to photographic picture image which was photographed immediately prior. In this mode, the photographic picture image photographed immediately prior is displayed on the LCD 6. The memo, which is input by the pen 41, is displayed superimposed over such prior photographic picture image.

In step S7, the CPU 39 determines whether the (EXEC) key 7B has been pressed. If it is determined (NO), that the execution key 7B has not been pressed, then the CPU returns to step S7 where it repeats the same process until the execution key 7B is pressed. If it is determined (YES), that the execution key 7B has been pressed, then the program proceeds to step S8. In step S8, the CPU 39 determines whether the variable chk is "1". If it is determined that the value of the variable chk is "0" (memo standard input mode: NO), then the program proceeds to step S9. Further, the CPU 39, after performing the run-length compression on the memo information that is stored in the buffer memory 36 and input from the touch tablet 6A, attaches the header information and stores it in a predetermined area of the memory card 24. Hence, the process is completed (END). After completing the process, the CPU 39 returns to the photographic mode.

In step S8, if it is determined (YES), that the value of the variable chk is "1", then the program proceeds to step S10. In step S10, the CPU 39, attaches the same header information as the photographic picture image photographed immediately prior and stores it in a predetermined area of the memory card 24. This is performed after performing the run-length compression on the memo information stored in the buffer memory 36 which is input from the touch tablet 6A. Hence, the process is completed (END). After completing the process, the CPU 39 returns to the photographic mode.

Figure 12:
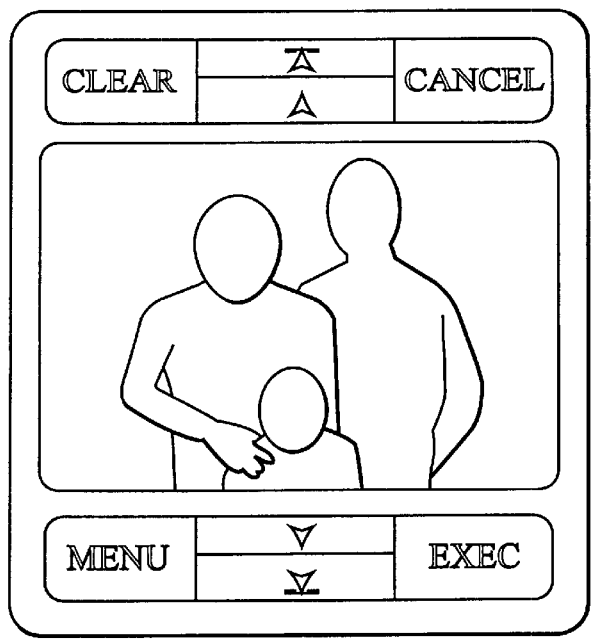
FIG. 12 shows a photograph of the interim picture image of the display screen when the process of FIG. 10 is executed in accordance with the invention.

Hereinafter, explanation of a specific example of the above process will be given. A picture image shown in FIG. 12 is photographed. Immediately following, the touch tablet 6A is operated, i.e. pressed, by the pen 41. In so doing, the CPU 39 sets the initial setting of the variable chk to "0" in step S1, determines (YES) that the touch tablet 6A has been operated in step S2, and thereby proceeds to step S3.

In step S3, it is determined whether the photography has been executed within the prescribed time period, for example 5 seconds immediately prior to the operating of the touch tablet 6A. Then, immediately following the photography of the picture image shown in FIG. 12, YES is determined in step S3 since the touch tablet 6A has been pressed. The program proceeds to step S5.

Figure 13:
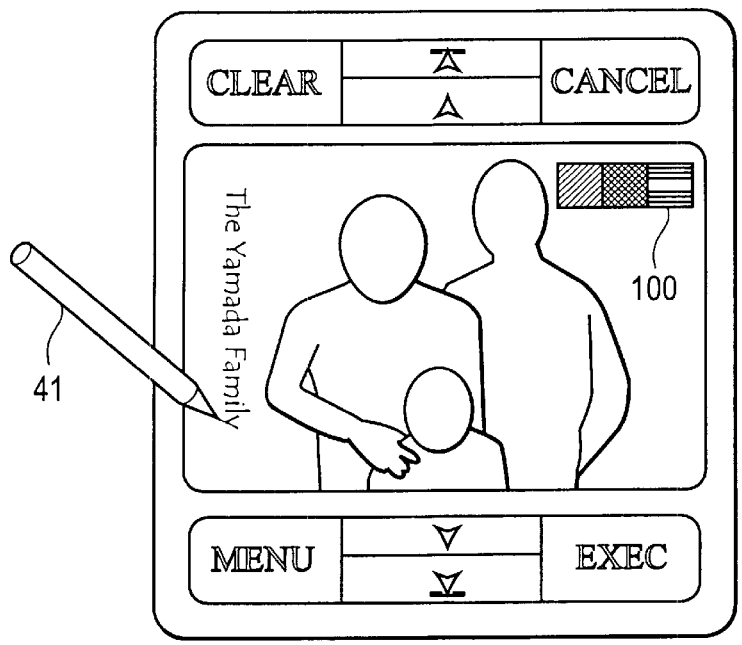
FIG. 13 shows a photograph of the interim picture image of another display screen when the process of FIG. 10 is executed.

In step S5, after substituting "1" for the variable chk, the program proceeds to step S6. Further, the input memo superimpose mode is initiated. When this mode is initiated, as shown in FIG. 13, it becomes possible to input a memo using pen 41 onto a picture image photographed immediately prior. In this example, the letters for "the Yamada family" are superimposed onto the photographic picture image shown in FIG. 12. Moreover, when performing this type of input, it is possible to change the display color of the memo by operating the pallet 100, displayed on the top right of the screen.

In step S7, the CPU 39 determines whether the execution key 7B is pressed. If the execution key 7B is pressed, the CPU 39 determines YES and the program proceeds to step S10. In step S10, the CPU 39, after performing the run-length compression on the memo information that is stored in the buffer memory 36, attaches the same header information as the photographic picture image shown in FIG. 12. The header information is stored in a predetermined area of the memory card 24. Hence, the process is completed (END).

Figure 14:
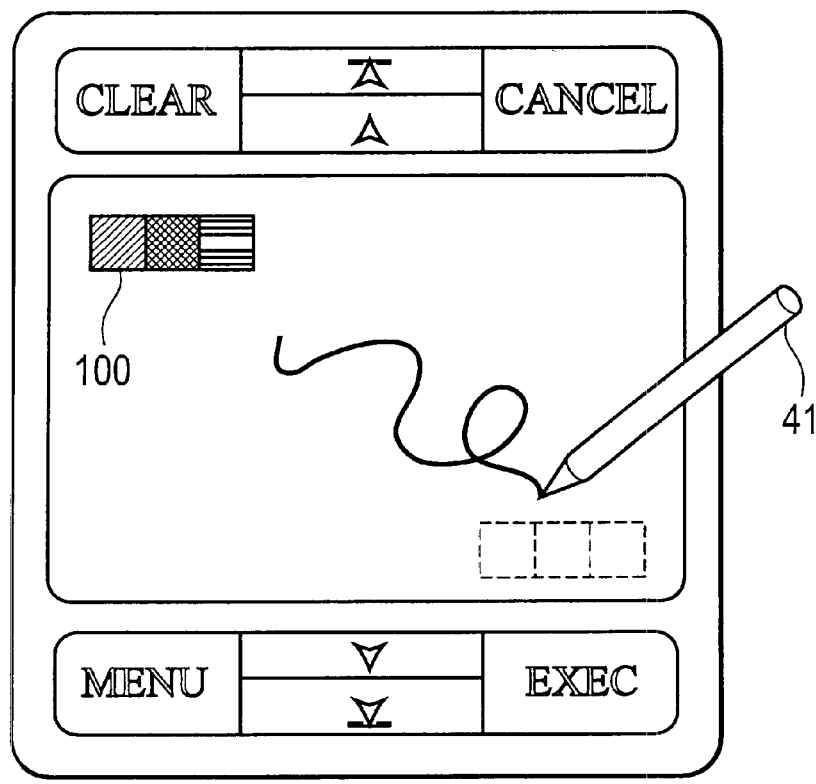
FIG. 14 shows the display screen in memo standard input mode in accordance with the invention.

By operating as described above, when displaying the recorded information, i.e. photographic picture image and memo information, in a single-view display, it becomes possible to display the thumbnail picture image and the memo codes. This display is similar to the display of the information "10:05" in the upper level of FIG. 9. In other words, these two types of information can be managed using the same recording unit. Accordingly, when reproducing this information, the picture image, superimposed by the photographic picture image, and the memo can be displayed as shown in FIG. 13. Moreover, in step S3, if it is determined (NO), that the photography was not executed within the prescribed time period, then the program proceeds to step S4. Then, the memo standard input mode is initiated and a display similar to that shown in FIG. 14 is given.

In other words, using the memo standard input mode, the background color of the LCD becomes blue, and it becomes possible to input a memo using pen 41. Moreover, in this display example, the pallet 100, displayed at the top left end of the screen, is for changing the color of the input memo. When selecting a desired color from within the pallet, the color of the input memo will be changed to the selected color. Further, the pallet 100 is set up so as to move (redisplay) to the farthest location from the pen 41 when the pen 41 approaches the pallet 100 so as to not interfere with the pen input. In the present display example, since the pen 41 is approaching the pallet 100, shown at the bottom right of FIG. 14 by a broken line, the pallet 100 moves to the top right of the figure. Also, to change color of the input lines, the pen is pressed directly on the pallet 100, after temporarily separating the pen 41 from the touch tablet 6A.

Memo information input using memo standard input mode is stored in a prescribed area of the memory card 24 by pressing the execution key 7B. In other words, when the execution key 7B is pressed, YES is determined in step S7, and hence NO is determined in step S8. Then, the program proceeds to step S9. In step S9, the CPU 39 attaches the header information and stores it in a predetermined area of the memory card 24, after performing the run-length compression on the memo information that is stored in the buffer memory 36. In this manner, when displaying stored memo information in a single-view display, it becomes possible for only the photographic time and memo code "*" to be displayed. That is, only memo information such as that shown in the "10:28" in FIG. 9.

With the present embodiment, if the touch tablet 6A is not operated after the prescribed time period, for example 1 minute, the display of the LCD 6 will terminate to conserve electrical energy. Accordingly, when executing the memo standard input mode of step S4 or the memo superimpose input mode of step S5, and also, for example, when the touch tablet 6A is not operated after the prescribed time period, the display of the LCD 6 will terminate. However, when the touch tablet 6A is operated again, the photographic picture image and the memo information input immediately prior to termination of the display of the LCD 6, is redisplayed again. Thus, continued input is possible.

In the aforementioned embodiment, when the touch tablet 6A is operated within the prescribed time period after performing photography, the memo superimpose input mode was initiated. However, the device may also, for example, be set up in the memo superimpose input mode when the touch tablet 6A is operated at the time of executing the prescribed process on a picture image. This might include, for example, picture image compression processing.

Figure 11:
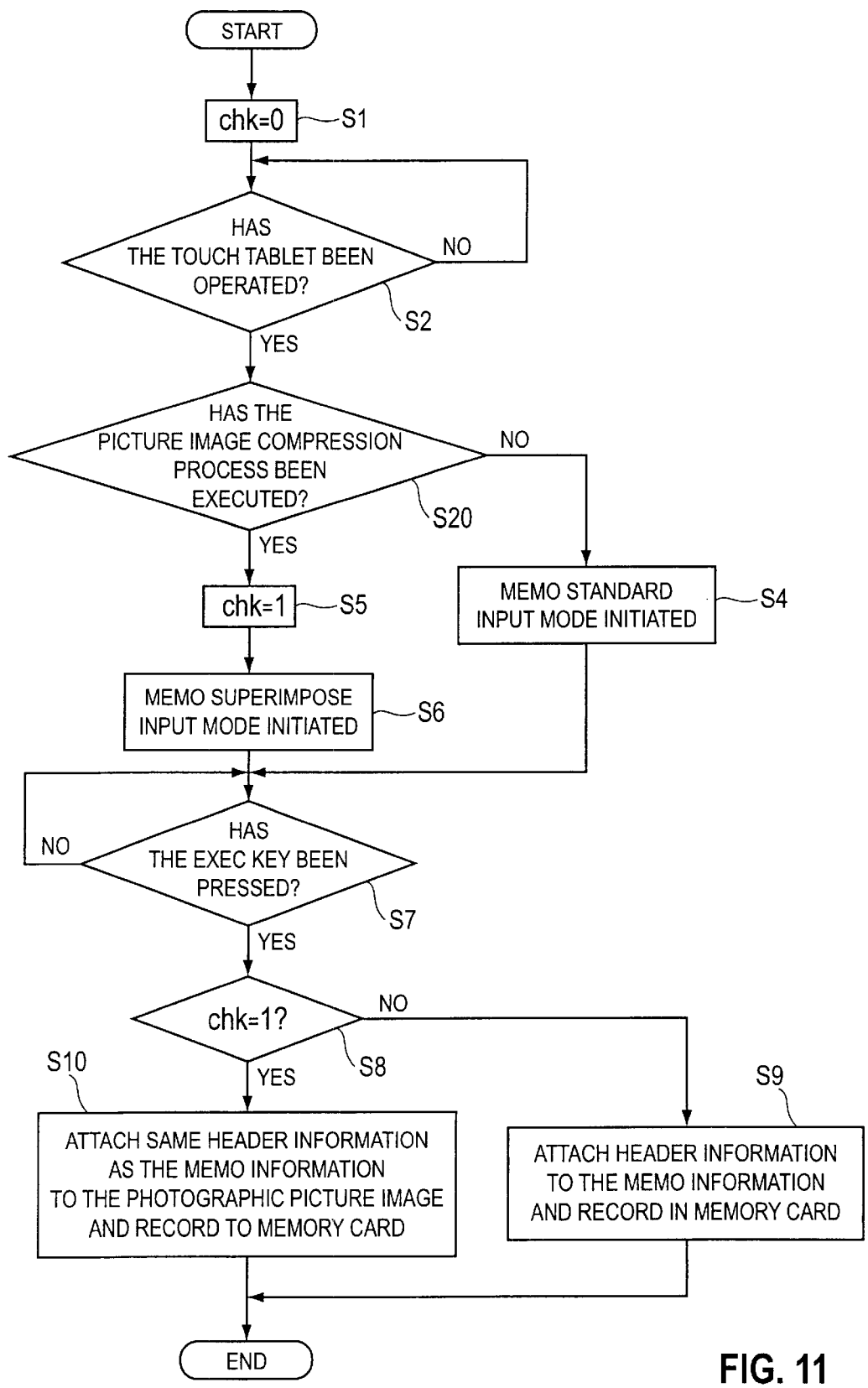
FIG. 11 is a flow chart showing another example of the process executed in the electronic camera shown in FIG. 1 in accordance with the invention.

FIG. 11 is a flow chart explaining an example of the process to initiate the memo superimpose input mode when the touch tablet 6A is operated during execution of the picture image process. In FIG. 11, since the same numerical codes are attached to the same portions as in FIG. 10, explanation thereof will be omitted. With this process, the process described in step S3 in FIG. 10 is changed to be step S20. Other processes are the same as in FIG. 10.

In step S20, the CPU determines whether a picture image process, for example, the picture image compression process, has been executed. If (YES), the picture image compression process has been executed, then the program proceeds to step S5. However, if it is determined (NO), that the picture image compression process has not been executed, then the program proceeds to step S4. Further, since the other processes are the same as those in FIG. 10, the explanation thereof will be omitted.

According to the process described above, it becomes possible to omit a complicated operation relating to switching modes by designating the processing time of the picture image compression, for example 1 second through 7 seconds, as the reception time for the memo superimpose input. Further, it may also be set up so that when the picture image process is executed (YES), at the time that the touch tablet 6A is operated, the CPU designates not only the picture image compression process but also, for example, that the picture image processing time includes the time until the compressed picture image data is stored to the memory card 24.

However, in the embodiment described above, when the touch tablet 6A is operated either during the period that the compression process of the photographic picture image is executed or within the prescribed time period which includes the compression process, the memo superimpose input mode is executed. However, when the processing capacity of the CPU 39 is low, the apparatus may also be set up so that the input from the touch tablet 6A is stopped during the execution of the compression process of the photographic picture image. The CPU 39 is then dedicated to the picture image compression process.

Figure 15:
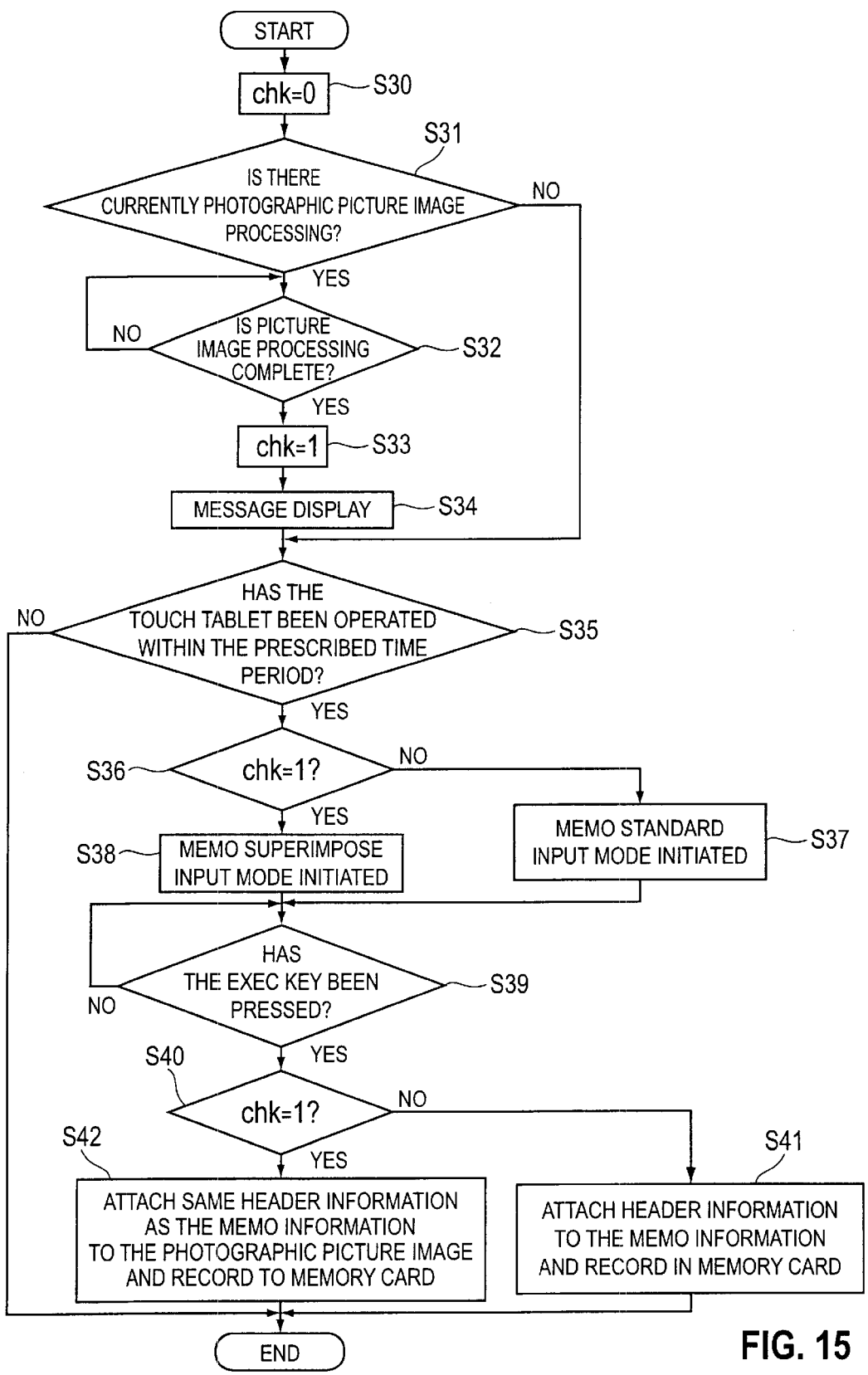
FIG. 15 is a flow chart showing operation of another process executed in the electronic camera shown in FIG. 1 in accordance with the invention.

FIG. 15 is a flow chart explaining an example of how the CPU 39 is dedicated to the picture image compression process. When the process is executed, in step S30, the CPU 39 sets the variable chk to "0". Then, continuing to step S31, the CPU determines whether the photographic picture image is being processed, for example, in a picture image compression process. If (YES), the photographic picture image is currently in a compression process, then the program proceeds to step S32. If (NO), a compression process of the photographic picture image is not being performed at that time, then the program proceeds to step S35.

Thus, during photographic picture image processing, the program proceeds to step S32, and the CPU 39 determines whether the picture image process is completed. If (NO), the picture image process is not completed, then the process returns to step S32. However, if it is determined (YES), that picture image processing is completed, then the program proceeds to step S33.

In step S33, the CPU 39 substitutes "1" for the variable chk. Then the program proceeds to step S34. In step S34, the CPU 39 displays on the LCD 6 a message such as the letter "M", for example. Such display is only for a prescribed time period. Then the program proceeds to step S35.

In step S35, the CPU determines whether the touch tablet 6A has been operated within the prescribed time period, i.e. the time that the message is displayed on the LCD 6. If (YES), touch tablet 6A has been operated within the prescribed time period, the program proceeds to step S36. However, if (NO), touch tablet 6A has not been operated within the prescribed time period, then the process is completed (END). Even when photography is not performed immediately prior (i.e. when chk=0), it is determined whether the touch tablet 6A is pressed within the time period corresponding to the time period that the message is displayed on the LCD 6.

In step S36, the CPU 39 determines whether the value of the variable chk is "1". If (NO), photography was not performed immediately prior and the value of the variable chk is "0", then the program proceeds to step S37. In step S37, the CPU 39 initiates the memo standard input mode and proceeds to step S39. In step S36, if it is determined (YES) that photography has been performed immediately prior and the value of the variable chk is "1", then the program proceeds to step S38. In step S38, the CPU 39 initiates the memo superimpose input mode and proceeds to step S39.

In step S39, the CPU 39 determines whether the execution key 7B has been pressed. If (NO), the execution key 7B has not been pressed, then the process returns to step S39 where it repeats the same process until the execution key 7B is pressed. If it is determined (YES), the execution key 7B has been pressed, then the program proceeds to step S40.

In step S40, the CPU 39 determines whether the variable chk is "1". If it is determined (NO), the value of the variable chk is "0", then the program proceeds to step S41. Further, the CPU 39, after performing the run-length compression on the memo information that is stored in the buffer memory 36 and attaching the prescribed header information, stores it in a predetermined area of the memory card 24.

Further, in step S40, if it is determined (YES) that the value of the variable chk is "1", then the program proceeds to step S42. In step S42, the CPU 39, after performing the run-length compression on the memo information that is stored in the buffer memory 36, and after attaching the same header information as the photographic picture image, stores it in a predetermined area of the memory card 24. Hence, the process is completed (END).

Figure 16:
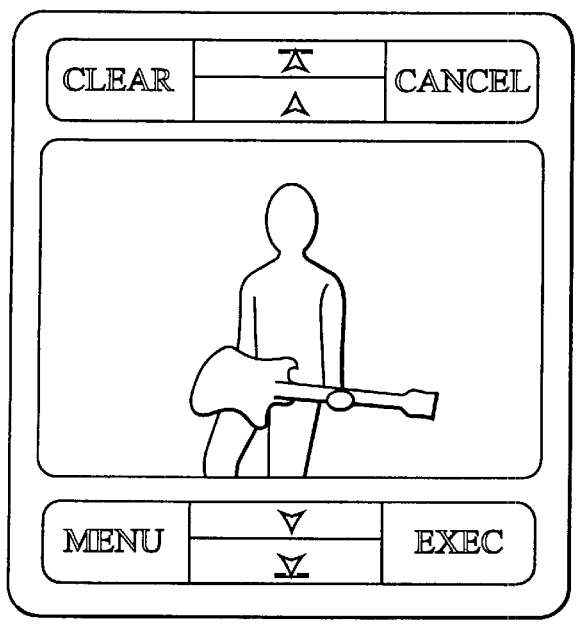
FIG. 16 shows a photograph of the interim picture image of the display screen when the process of FIG. 15 is executed in accordance with the invention.

Next, explanation of a specific example of the above described process will be given. When a picture image, such as that shown in FIG. 16, is photographed the process shown in FIG. 15 is executed during execution of the picture image processing. Under those conditions, in step S30, after the variable chk is set to an initial setting "0", a YES determination is made in step S31 that photographic picture image processing is ongoing. Then the program proceeds to step S32.

The picture image processing, for example, includes the picture image compression process which compresses the photographic picture image, and the transfer process which transfers the compressed picture image to the memory card 24. However, in steps S31 and step S32, this may be designated as a process. For example, the picture image compression process adds a comparatively extra load to the CPU 39. In other words, even if the CPU is in the process of executing the transfer process, when the picture image compression process is completed, the CPU can judge YES (that the picture image process is complete) in step S32. As a result, the input of the memo is initiated.

Figure 17:
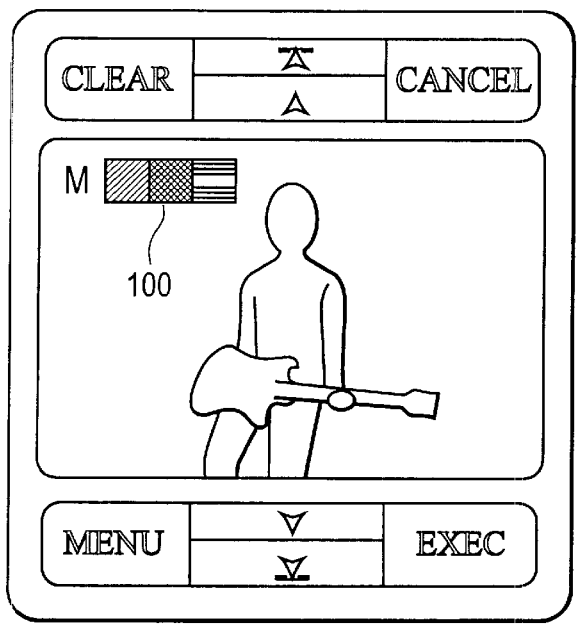
FIG. 17 shows a photograph of the interim picture image of another display screen when the process of FIG. 15 is executed in accordance with the invention.
Figure 18:
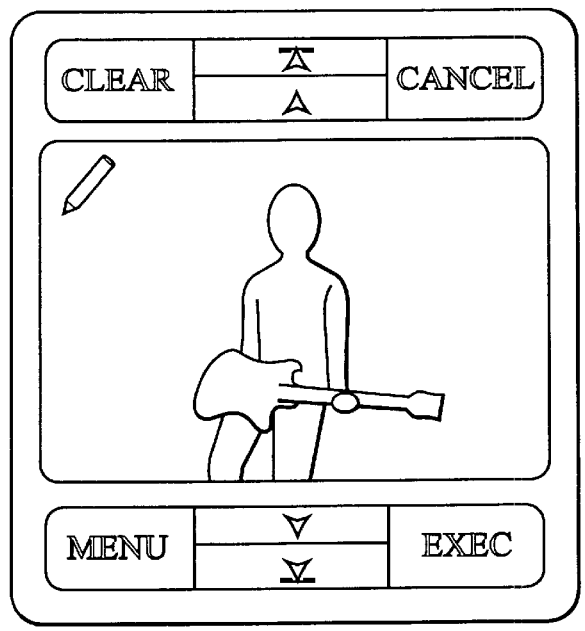
FIG. 18 shows a photograph of the interim picture image of yet another display screen when the process of FIG. 15 is executed in accordance with the invention.

In step S32, the CPU 39, after waiting until picture image processing is completed, proceeds to step S33. In step S33, the CPU, after substituting "1" for the variable chk, proceeds to step S34. As is shown in FIG. 17, the letter "M" is displayed in the top left end of the LCD 6 for only the prescribed time period. Also, instead of displaying the letter "M", an icon, for example, depicting a pen such as that displayed in the top left corner of FIG. 18 may also be displayed.

Further, in FIG. 17, the pallet 100 is displayed in the top left of the display screen. The letter "M" can look unattractive in some circumstances due to the effects of the background. Under these circumstances, the pallet 100 is displayed to be indicative of a condition in which the selection of the memo superimpose input mode is possible. Further, by simultaneously displaying the pallet 100, the meaning of the letter "M", i.e. that the CPU is in a state which allows the selection of the memo superimpose input mode, can be more easily understood. Finally, even in the example of FIG. 18, the pallet 100 may be displayed together with the icon depicting the pen.

Continuing with step S35, the CPU 39 determines whether the touch tablet 6A has been operated within the prescribed time period, i.e. the time period during which the letter "M" or the pen icon is displayed. If the result is determined (YES) that the touch tablet 6A has been operated, then the program proceeds to step S36. If (NO), the touch tablet 6A has not been operated, then the process is completed.

Figure 19:
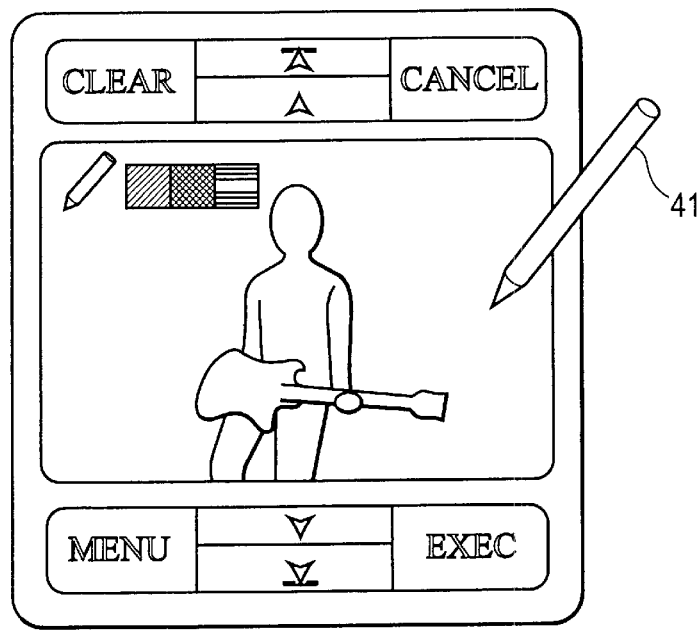
FIG. 19 shows a photograph of the interim picture image of yet another display screen when the process of FIG. 15 is executed in accordance with the invention.
Figure 20:
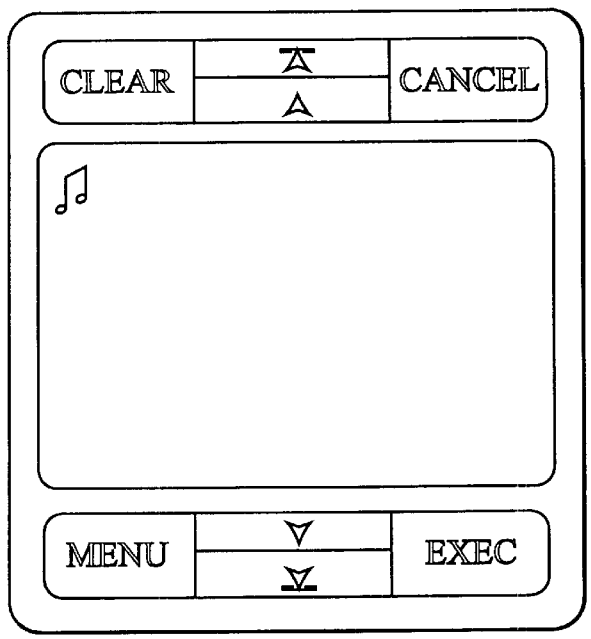
FIG. 20 shows an example of the display screen when audio is reproduced in accordance with the invention.

In step S36, the CPU 39 determines whether the value of the variable chk is "1". In the example, since chk=1, then YES is determined in step S36. The program proceeds to step S38 where the memo superimpose input mode is executed. The result is that, as shown in FIG. 19, input of a memo superimposed onto the photographic picture image is possible. Moreover, when performing this type of input, the display color of the memo is able to be changed by operating the pallet 100. The pallet 100 is displayed at the top left of the screen. Further, after completing input of the memo, when the execution key 7B is pressed, YES is determined in step S39. The program proceeds to step S40.

In step S40, it is determined whether the value of the variable chk is "1". In the example, since chk=1 and photography is being performed, YES is determined. The program proceeds to step S42. In step S42, the CPU 39, after performing the run-length compression on the memo information that is stored in the buffer memory 36, attaches the same header as the photographic picture image shown in FIG. 16. The CPU stores the header to a prescribed area of the memory card 24. When displaying the recorded information in a single-view display in this manner, the memo code and the thumbnail image are displayed. The display is similar to "10:05" shown in FIG. 9. In other words, these types of information are stored in the memory card 24 as the same recording unit. Accordingly, when reproducing this information, the memo information and the picture image will be superimposed and displayed as shown in FIG. 19.

Moreover, when the touch tablet 6A is operated when photography is not performed, NO will be determined in step S31. YES will be determined in step S35. Further, in step S36, since chk=1, the program proceeds to step S37, and the memo standard input mode is initiated. The memo standard input mode is the mode which inputs only the memo information in the same manner as the example shown in FIG. 14.

After the memo is input with the memo standard input mode and the execution key 7B is pressed, YES is determined in step S39. Thereafter, NO (chk=1) is determined in step S40 since photography is not being performed. The program proceeds to step S41. In step S41, the CPU 39 performs run-length compression on the memo information that is stored in the buffer memory 36. After attaching prescribed header information, the memo information is stored in a prescribed area of the memory card 24. Moreover, when displaying the stored information in this manner as a single-view display, only the recorded time and the memo code will be displayed, as in the display of information "10:28", shown in FIG. 9.

In the embodiment described above, the photographic picture image and the memo were described. However, an audio input mode for inputting audio sound information, for example, may be provided. The apparatus may also be set to appropriately select a type of input mode. For example, with regard to step S6 of FIG. 10, the memo superimpose input mode may be initiated and the sound recording switch 12 may be pressed during the time period until the execution key 7B is pressed. Thereafter, it is possible to attach the same header information to the input audio data as the photographic picture image, which can be recorded to the memory card 24.

Figure 21:
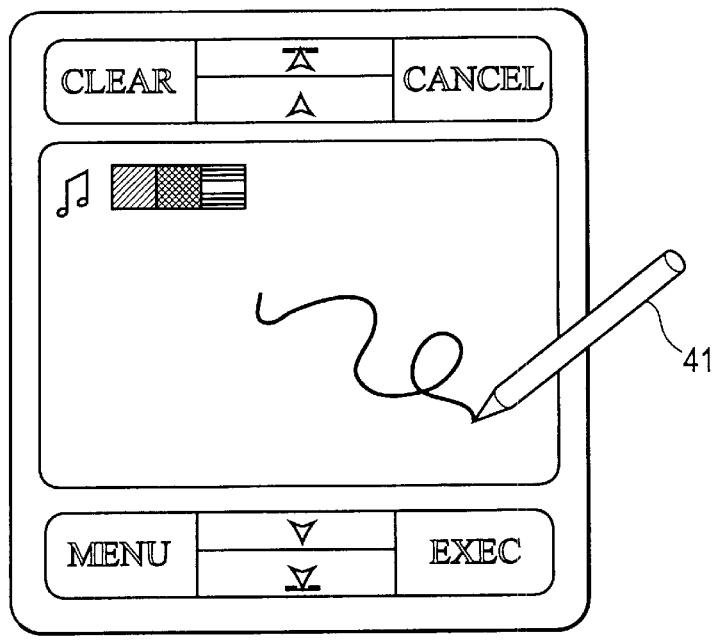
FIG. 21 shows an example of a display when the memo standard input mode was performed when reproducing the audio sound.

Further, when audio is being reproduced, a memo may also be input. For example, if designating the reproduction of the information (audio only information) of "10:27" shown in FIG. 9, then the mark of the sound code, for example 2 successive marks are displayed in the upper left end of the LCD 6, and the audio can be reproduced. In this example illustrating audio reproduction, when the touch tablet 6A is operated, as shown in FIG. 21, the memo standard input mode may be set. This allows input of a memo. Moreover, a memo input in this manner provides for the same header information to be attached as the audio sound data after performing the run-length compression process. The memo can be recorded to the memory card 24.

When reproducing recorded information in the manner described above, in addition to the display of the memo and audio sound mark, the audio can be reproduced.

With the present embodiment as described above, a description was provided for only the photographic picture image, memo and audio sound. However, it is also possible to perform the same or similar processes in regard to other information. Further, the invention, is not only limited to the electronic camera described in the present embodiment above. The invention can also be applied to other information processing apparatus.

According to an aspect of the information processing apparatus of the invention, improved operability is possible regarding mode switching. A mode selection unit is provided to select the photographic mode and the memo input mode. A control unit controls the mode selection unit. A detection unit detects whether input has occurred based on the position information input device.

The detection unit detects the occurrence of input from the position information input device when the photographic mode is selected by the mode selection unit. As a result, the control unit controls the mode selection unit to select the memo input mode.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information processing apparatus operable to input an image information that is photographed and a memo information that is inputted from a position information input device, the information processing apparatus comprising:

a controller;

a recording device that records said image information and said memo information; and a detector that detects whether inputting the memo information has occurred from said position information input device within a predetermined period since photographing said image information;

wherein when said detector detects that inputting the memo information has occurred within said predetermined period, said controller controls the recording device to store said memo information as correlated to said image information, and when said detector detects that inputting the memo information has occurred after said predetermined period since photographing said image information, said controller controls the recording device to store said memo information as independent data from said image information.

2. The information processing apparatus according to claim 1, further comprising:

a display device; and wherein said controller outputs, within said predetermined period, a message to the display device, said message indicating that permission is granted for the input of said memo information.

3. The information processing apparatus according to claim 1, further comprising:

a display device which displays said image information; and wherein said memo information inputted within said predetermined period since photographing said image information is superimposed into said image information and output to said display device together with said image information.

4. The information processing apparatus according to claim 1, further comprising:

a display device which displays said image information; and wherein said memo information inputted within an image processing time period since photographing said image information is superimposed into said image information and output to said display device together with said image information.

5. The information processing apparatus according to claim 1, wherein said position information input device includes of a touch table that is arranged on a display device.

6. An information processing apparatus operable to input a first information and a second information, the information processing apparatus comprising:

a controller;

a recording device that records said first information and said second information; and a detector that detects whether the inputting operation of the second information has occurred within a period of processing said first information;

wherein when said detector detects that the inputting operation of the second information has occurred within the processing period, said controller controls the recording device to store said second information as correlated to said first information; and when said detector detects that the inputting operation of the second information has occurred after the processing period, said controller controls the recording device to store second information as independent data from the image information.

* * * * *